United States Patent
Edge et al.

(10) Patent No.: US 11,812,301 B2
(45) Date of Patent: *Nov. 7, 2023

(54) METHODS AND SYSTEMS FOR SEGMENTATION OF POSITIONING PROTOCOL MESSAGES

(71) Applicant: QUALCOMM Incorporated, San Diego, CA (US)

(72) Inventors: Stephen William Edge, Escondido, CA (US); Sven Fischer, Nuremberg (DE)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/450,967

(22) Filed: Oct. 14, 2021

(65) Prior Publication Data

US 2022/0038952 A1   Feb. 3, 2022

Related U.S. Application Data

(63) Continuation of application No. 16/148,722, filed on Oct. 1, 2018, now Pat. No. 11,240,706.

(Continued)

(51) Int. Cl.
*H04B 7/185* (2006.01)
*H04W 28/06* (2009.01)
(Continued)

(52) U.S. Cl.
CPC .......... *H04W 28/06* (2013.01); *H04L 1/0083* (2013.01); *H04W 4/20* (2013.01); *H04L 1/18* (2013.01); *H04W 64/00* (2013.01)

(58) Field of Classification Search
None
See application file for complete search history.

(56) References Cited

U.S. PATENT DOCUMENTS 8,428,022 B2 * 4/2013 Frank .................. H04L 27/2607
370/329
8,463,294 B2 * 6/2013 Kone .................... H04W 4/025
455/456.3

(Continued)

FOREIGN PATENT DOCUMENTS

CN        102546133 A    7/2012
EP        2466778 A1     6/2012
(Continued)

OTHER PUBLICATIONS

Taiwan Search Report—TW107134984—TIPO—Oct. 17, 2021.
(Continued)

*Primary Examiner* — Sithu Ko
(74) *Attorney, Agent, or Firm* — Thien T. Nguyen

(57) ABSTRACT

Methods and techniques are described for limiting a size of LTE Positioning Protocol (LPP) messages in a location session between a user equipment and location server. In one embodiment, a first device sends a first LPP message to a second device, indicating that the first device is capable of receiving segmented LPP messages. Subsequently, the first device receives a plurality of LPP message segments from the second device comprising one or more non-final LPP message segments and a final LPP message segment, where each LPP message segment includes a "non-final" or "final" indication. The first device stores the non-final LPP message segments and processes the LPP message segments after receiving the final LPP message segment. Prior to sending the first LPP message, the first device may receive an LPP message from the second device indicating the second device is capable of sending segmented LPP messages.

34 Claims, 10 Drawing Sheets

Related U.S. Application Data

(60) Provisional application No. 62/587,428, filed on Nov. 16, 2017, provisional application No. 62/569,551, filed on Oct. 8, 2017.

(51) Int. Cl.
*H04L 1/00* (2006.01)
*H04W 4/20* (2018.01)
*H04W 64/00* (2009.01)
*H04L 1/18* (2023.01)

(56) References Cited

U.S. PATENT DOCUMENTS

| | | | | |
|---|---|---|---|---|
| 8,660,072 | B2* | 2/2014 | Siomina | G01S 1/0428 370/329 |
| 8,660,540 | B2 | 2/2014 | Edge et al. | |
| 8,761,802 | B2* | 6/2014 | Kone | H04W 4/20 455/456.3 |
| 8,909,271 | B2* | 12/2014 | Stern-Berkowitz | G01S 5/10 455/456.1 |
| 8,971,920 | B2 | 3/2015 | Jiang et al. | |
| 8,983,499 | B2 | 3/2015 | Blumstein et al. | |
| 8,995,393 | B2 | 3/2015 | Siomina et al. | |
| 9,270,587 | B2* | 2/2016 | Horn | H04W 4/025 |
| 9,277,523 | B2* | 3/2016 | Sampath | H04W 4/025 |
| 9,435,874 | B2 | 9/2016 | Edge et al. | |
| 9,686,190 | B2 | 6/2017 | Tamir et al. | |
| 10,256,957 | B2* | 4/2019 | Park | H04W 72/005 |
| 10,555,128 | B2* | 2/2020 | Yu | H04W 4/02 |
| 10,652,846 | B2* | 5/2020 | Khoryaev | H04W 56/002 |
| 10,721,710 | B2* | 7/2020 | Sirotkin | H04W 64/003 |
| 10,945,122 | B2* | 3/2021 | Gunnarsson | H04W 64/00 |
| 11,012,950 | B2* | 5/2021 | Wei | H04W 52/146 |
| 2011/0117925 | A1 | 5/2011 | Sampath et al. | |
| 2012/0044797 | A1 | 2/2012 | Huang et al. | |
| 2012/0147732 | A1 | 6/2012 | Chien et al. | |
| 2012/0244852 | A1 | 9/2012 | Edge et al. | |
| 2013/0255185 | A1 | 10/2013 | Cao | |
| 2014/0079076 | A1 | 3/2014 | Kamble et al. | |
| 2014/0087759 | A1 | 3/2014 | Blumstein et al. | |
| 2014/0302870 | A1 | 10/2014 | Cui et al. | |
| 2015/0230057 | A1 | 8/2015 | Jiang et al. | |
| 2017/0070971 | A1 | 3/2017 | Wietfeldt et al. | |
| 2017/0279899 | A1 | 9/2017 | Jain et al. | |
| 2019/0089498 | A1* | 3/2019 | Pelletier | H04L 5/003 |
| 2019/0110225 | A1 | 4/2019 | Edge et al. | |
| 2020/0154496 | A1* | 5/2020 | Yi | H04W 76/15 |
| 2021/0045174 | A1* | 2/2021 | Choi | H04W 72/1263 |
| 2021/0067918 | A1* | 3/2021 | Baek | H04W 72/0453 |

FOREIGN PATENT DOCUMENTS

| | | |
|---|---|---|
| WO | WO 2012060933 A1 | 5/2012 |
| WO | 2013033464 A2 | 3/2013 |
| WO | 2014042765 | 3/2014 |

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 14)", 3GPP DRAFT; 36355-E30, Sep. 26, 2017, XP051354082, Retrieved from the Internet: URL:http://www.3gpp.org/ftp/tsg_ran/WG2_RL2/Specifications/201709_final_specs_after_RAN_77/ [retrieved on Sep. 26, 2017].

Edge S., et al., "LPPe 1.0 TS Assistance Data Segmentation", Doc# OMA-LOC-2010-0276-CR_LPPE_1.0-TS_ASSISTANCE_DATA_SEGMENTATION.DOCCHANGE REQUEST, Nov. 5, 2010 (Nov. 5, 2010), pp. 1-28, XP002669605, Retrieved from the Internet: URL: http://member.openmobilealliance.org/ftp/public_documents/loc/2010/OMA-LOC-2010-0276-CR_LPPe_1.0_TS_Assistance_Data_Segmentation.zip [retrieved on Feb. 15, 2012] Change 1 of OMA-CR276, p. 2-p. 5.

Ericsson et al., "Segmentation and Reassembly Support for LPP", 3GPP DRAFT; R2-095786, 3rd Generation Partnership Project (3GPP), Mobile Competence Centre ; 650, Route Des Lucioles; F-06921 Sophia-Antipolis Cedex; France, No. Miyazaki; Oct. 12, 2009, Oct. 12, 2009, XP050390274, [retrieved on Oct. 6, 2009], 2 pages.

International Preliminary Report on Patentability—PCT/US2018/053863, The International Bureau of WIPO—Geneva, Switzerland, dated Apr. 16, 2020.

International Search Report and Written Opinion—PCT/US2018/053863—ISA/EPO—dated Feb. 13, 2019.

Qualcomm Europe: "Initial Proposed Contents for Stage 3 LPP Specification", 3GPP TSG-RAN WG2 #67, R2-094407, Aug. 24-28, 2009 Shenzhen, China, 18 Pages.

\* cited by examiner

METHODS AND SYSTEMS FOR SEGMENTATION OF POSITIONING PROTOCOL MESSAGES

RELATED APPLICATIONS

This application is a continuation of U.S. application Ser. No. 16/148,722, filed Oct. 1, 2018, entitled "METHODS AND SYSTEMS FOR SEGMENTATION OF POSITIONING PROTOCOL MESSAGES," which claims the benefit of U.S. Provisional Application No. 62/569,551, filed Oct. 8, 2017, entitled "METHODS AND SYSTEMS FOR SEGMENTATION OF POSITIONING PROTOCOL MESSAGES," and U.S. Provisional Application No. 62/587,428, filed Nov. 16, 2017, entitled "METHODS AND SYSTEMS FOR SEGMENTATION OF POSITIONING PROTOCOL MESSAGES." All of these applications are assigned to the assignee hereof and incorporated by reference herein in their entirety.

BACKGROUND

1. Field

The subject matter disclosed herein relates to wireless communications systems, and more particularly to systems and methods for location of a user equipment in a wireless communications system using a positioning protocol.

2. Information

It is often desirable to know the location of a user equipment (UE) such as a cellular phone. The location can be used for any of a variety of applications, such as to enable a UE to provide navigation information to a user, to enable a person or asset finder service, or to provide a location of a UE to emergency responders for an emergency services call. The process of determining the location of the UE may involve, among other things, communication between the UE and a location server (LS), such as an Enhanced Serving Mobile Location Center (E-SMLC), using a positioning protocol such as the Long Term Evolution (LTE) Positioning Protocol (LPP).

In some instances, however, the size of a positioning protocol (e.g. LPP) messages may cause a problem. For instance, the size of an LPP message may exceed a size limit imposed by a transport protocol used to transport the LPP message between the UE and the LS. In that case, it may not be possible to transport the LPP message resulting in possible failure to locate the UE or impairment (e.g. lower accuracy) in a location estimate obtained for the UE.

SUMMARY

Methods and techniques disclosed herein address these and other issues by limiting a size of LTE Positioning Protocol (LPP) messages in a location session between a user equipment and location server. Embodiments may allow for a first device to send a first LPP message to a second device, indicating that the first device is capable of receiving segmented LPP messages. Subsequently, the first device can receive a plurality of LPP message segments from the second device comprising one or more non-final LPP message segments and a final LPP message segment, where each LPP message segment includes a "non-final" or "final" indication. The first device can then store the non-final LPP message segments and processes the LPP message segments after receiving the final LPP message segment. Prior to sending the first LPP message, the first device may receive an LPP message from the second device indicating the second device is capable of sending segmented LPP messages.

A first example method for limiting a size of LPP messages in a location session, according to the disclosure, comprises sending, from a first device to a second device, a first LPP message including an indication that the first device is capable of receiving segmented LPP messages, and after the sending of the first LPP message, receiving, at the first device from the second device, a plurality of LPP message segments comprising one or more non-final LPP message segments and a final LPP message segment. Each non-final LPP message segment of the one or more non-final LPP message segments includes an indication that the respective non-final LPP message segment is non-final, and the final LPP message segment includes an indication that the final LPP message segment is final.

Alternative embodiments of the first example method may include one or more the following features. The first device may comprise an Enhanced Serving Mobile Location Center (E-SMLC) or a Location Management Function (LMF) and the second device may comprise a User Equipment (UE), or the first device may comprise a UE and the second device may comprise an E-SMLC or LMF. The first LPP message may comprise an LPP Request Capabilities Message, an LPP Provide Capabilities message or an LPP Request Location Information message. Prior to sending the first LPP message, the first device may receive a second LPP message from the second device including an indication that the second device is capable of sending segmented LPP messages. The second LPP message may comprise an LPP Request Capabilities message. Each LPP message segment in the plurality of LPP message segments may comprise a well formed LPP message for a same LPP message type. The same LPP message type may comprise an LPP Provide Capabilities message type, an LPP Provide Assistance Data message type, an LPP Request Assistance Data message type, an LPP Request Location Information message type, or an LPP Provide Location Information message type. The method may further comprise processing, by the first device, each LPP message segment of the plurality of LPP message segments when the each LPP message segment is received, wherein the processing is based on the same LPP message type. The method may further comprise storing, at the first device, each non-final LPP message segment of the one or more non-final LPP message segments, and processing, by the first device, the plurality of LPP message segments after the final LPP message segment is received, wherein the processing is based on the same LPP message type. The method may further comprise storing, at the first device, one or more of the non-final LPP message segments of the plurality of LPP message segments, subsequent to storing the one or more of the non-final LPP message segments of the plurality of LPP message segments, determining an error, by the first device, in the receipt of at least one of the plurality of LPP message segments, and in response to determining the error, discarding, by the first device, the one or more of the non-final LPP message segments of the plurality of LPP message segments. The method may further comprise sending from the first device to the second device, a message indicative of the determination of the error. Determining the error in the receipt of the at least one of the plurality of LPP message segments may comprise determining that the at least one of the plurality of LPP message segments received at the first device has a different message type than the one or more of the non-final LPP message segments of the plurality of LPP message segments. Determining the error in the receipt of the at least one of the plurality of LPP message segments may comprise determining that the at least one of the plurality of LPP message segments received at the first device has an invalid message type for a current state of a procedure for the plurality of LPP message segments.

A second example method for limiting a size of Long Term Evolution (LTE) Positioning Protocol (LPP) messages in a location session, according to the disclosure, comprises receiving, from a first device at a second device, a first LPP message including an indication that the first device is capable of receiving segmented LPP messages, after the receiving of the first LPP message, determining that a size of a prospective LPP message will exceed a certain threshold, and sending, from the second device to the first device, a plurality of LPP message segments comprising information corresponding to the prospective LPP message, the plurality of LPP message segments comprising one or more non-final LPP message segments and a final LPP message segment wherein each non-final LPP message segment of the one or more non-final LPP message segments includes an indication that the respective non-final LPP message segment is non-final, and the final LPP message segment includes an indication that the final LPP message segment is final.

Alternative embodiments of the second example method may include one or more the following features. The first device may comprise an Enhanced Serving Mobile Location Center (E-SMLC) or a Location Management Function (LMF) and the second device may comprise a User Equipment (UE), or the first device may comprise a UE and the second device may comprise an E-SMLC or LMF. The first LPP message may comprise an LPP Request Capabilities Message, an LPP Provide Capabilities message, or an LPP Request Location Information message. Each LPP message segment in the plurality of LPP message segments may comprise a well formed LPP message for a same LPP message type as the prospective LPP message. The same LPP message type may comprise an LPP Provide Capabilities message type, an LPP Provide Assistance Data message type, an LPP Request Assistance Data message type, an LPP Request Location Information message type, or an LPP Provide Location Information message type. Prior to receiving the first LPP message, the second device may send a second LPP message to the first device including an indication that the second device is capable of sending segmented LPP messages. The second LPP message may comprise an LPP Request Capabilities message. The method may further comprise receiving, at the second device from the first device, a message indicative of a determination of an error in the receipt of at least one of the plurality of LPP message segments, and in response to receiving the message indicative of the determination of the error, aborting an LPP session associated with the plurality of LPP message segments.

An example device for receiving segmented Long Term Evolution (LTE) Positioning Protocol (LPP) messages, according to the disclosure, comprises a communication interface, a memory, and a processing unit communicatively coupled with the communication interface and the memory and configured to cause the device to send, via the communication interface to a transmitting device, a first LPP message including an indication that the device is capable of receiving segmented LPP messages, and after the sending of the first LPP message, receive, via the communication interface from the transmitting device, a plurality of LPP message segments comprising one or more non-final LPP message segments and a final LPP message segment. Each non-final LPP message segment of the one or more non-final LPP message segments includes an indication that the respective non-final LPP message segment is non-final, and the final LPP message segment includes an indication that the final LPP message segment is final.

Alternative embodiments of the example device may comprise one or more of the following features. The device may comprise an Enhanced Serving Mobile Location Center (E-SMLC) or a Location Management Function (LMF) and the transmitting device may comprise a User Equipment (UE), or the device may comprise a UE and the transmitting device comprises an E-SMLC or LMF. The device may be configured to receive, prior to sending the first LPP message, a second LPP message from the transmitting device including an indication that the transmitting device is capable of sending segmented LPP messages. The processing unit may be further configured to cause the device to receive each LPP message segment in the plurality of LPP message segments comprising a well formed LPP message for a same LPP message type. The processing unit may be further configured to cause the device to store, in the memory, each non-final LPP message segment of the one or more non-final LPP message segments, and process the plurality of LPP message segments after the final LPP message segment is received, wherein the processing may be based on the same LPP message type. The processing unit may be further configured to cause the device to store, in the memory, one or more of the non-final LPP message segments of the plurality of LPP message segments, subsequent to storing the one or more of the non-final LPP message segments of the plurality of LPP message segments, determine an error in the receipt of at least one of the plurality of LPP message segments, and in response to determining the error, discard the one or more of the non-final LPP message segments of the plurality of LPP message segments.

An example device for transmitting segmented Long Term Evolution (LTE) Positioning Protocol (LPP) messages, according to the disclosure, comprises a communication interface, a memory, and a processing unit communicatively coupled with the communication interface and the memory and configured to cause the device to receive, via the communication interface from a receiving device, a first LPP message including an indication that the receiving device is capable of receiving segmented LPP messages, after the receiving of the first LPP message, determine that a size of a prospective LPP message will exceed a certain threshold; and send, via the communication interface to the receiving device, a plurality of LPP message segments comprising information corresponding to the prospective LPP message, the plurality of LPP message segments comprising one or more non-final LPP message segments and a final LPP message segment. Each non-final LPP message segment of the one or more non-final LPP message segments includes an indication that the respective non-final LPP message segment is non-final, and the final LPP message segment includes an indication that the final LPP message segment is final.

Alternative embodiments of the example device may further comprise one or more of the following features. The receiving device may comprise an Enhanced Serving Mobile Location Center (E-SMLC) or a Location Management Function (LMF) and the device may comprise a User Equipment (UE), or the receiving device may comprise a UE and the device may comprise an E-SMLC or LMF. The processing unit may be further configured to cause the device to send, prior to receiving the first LPP message, a second LPP message to the receiving device including an indication that the device is capable of sending segmented LPP messages. The processing unit may be further configured to cause the device to receive, via the communication interface from the receiving device, a message indicative of a determination of an error in the receipt of at least one of the plurality of LPP message segments, and in response to receiving the message indicative of the determination of the error, abort an LPP session associated with the plurality of LPP message segments.

BRIEF DESCRIPTION OF DRAWINGS

Non-limiting and non-exhaustive aspects are described with reference to the following figures, wherein like reference numerals refer to like parts throughout the various figures unless otherwise specified.

Like numbers are used in the figures to show like elements.

DETAILED DESCRIPTION

Figure 1:
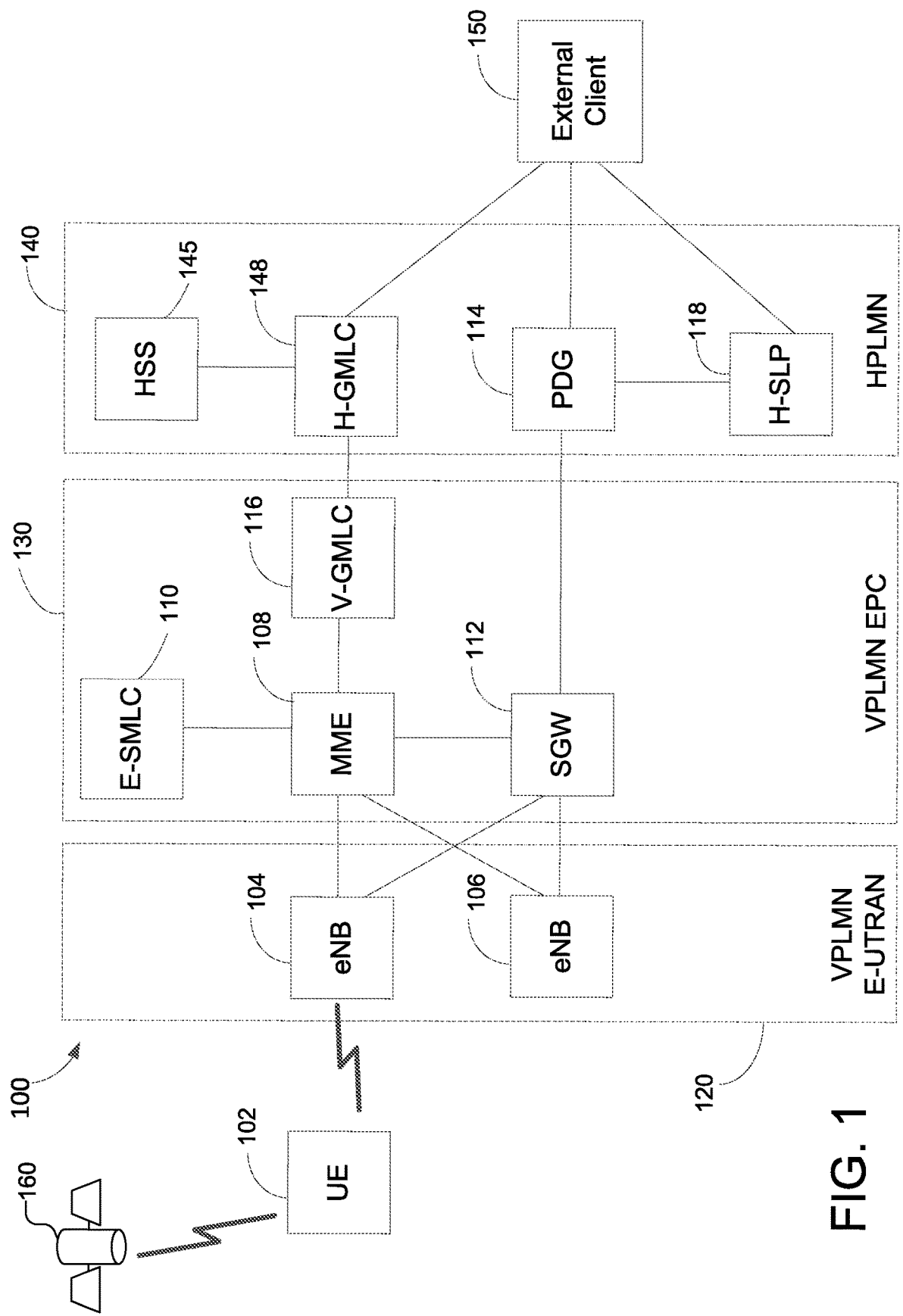
FIG. 1 is a simplified block diagram illustrating the architecture of a system for enabling support of location for a user equipment (UE), according to an embodiment.

Several illustrative embodiments are described herein with respect to the accompanying drawings, which form a part hereof. The ensuing description provides embodiment(s) only, and is not intended to limit the scope, applicability or configuration of the disclosure. Rather, the ensuing description of the embodiment(s) provides those skilled in the art with an enabling description for implementing an embodiment. It is understood that various changes may be made in the function and arrangement of elements without departing from the spirit and scope of this disclosure.

It can be noted that, although embodiments described herein refer to specific technologies and standards, such as LPP, a person of ordinary skill in the art will recognize that the techniques provided herein may be applied to other technologies, standards, and/or wireless environments.

It is often desirable to know the location of a UE such as a cellular phone, tablet, personal media player, in-vehicle system, or similar electronic device. The location can be used for any of a variety of applications, such as to enable a UE to provide navigation information to a user, to enable a person or asset finder service, or to provide a location of a UE to an emergency responder for an emergency services call. The process of determining the location of the UE may involve, among other things, communication between the UE and a location server (LS), such as an Enhanced Serving Mobile Location Center (E-SMLC), using a positioning protocol such as the LTE Positioning Protocol (LPP) defined by the Third Generation Partnership Project (3GPP) in 3GPP Technical Specification (TS) 36.355.

In some instances, however, the size of a positioning protocol (e.g. LPP) message may cause a problem. For example, in the case of LPP, the size of an LPP message may exceed a size limit imposed by a transport protocol used to transport the LPP message between the UE and the LS. For instance, an LPP message may exceed the maximum size of 8188 octets that may be allowed by the Packet Data Convergence Protocol (PDCP) transport protocol that may be used to transfer LPP messages between the UE and a serving base station (e.g. an eNB) for control plane location with LTE access. An implication is that the UE and the LS (e.g. an E-SMLC) may need to restrict LPP message size to below this maximum. But this may be an awkward solution that may impair an LPP session by limiting or not providing certain important information to another entity.

Techniques described herein, which relate generally to communication and more specifically to techniques for supporting location services for UEs, may address these and other issues by enabling positioning protocol (e.g. LPP) messages to be segmented. With segmentation, a prospective message for a positioning protocol (e.g. an LPP message) that would exceed a message size limit (e.g. 8188 octets in the case of control plane location for LTE access) is segmented (or divided) into two or more smaller positioning protocol messages, referred to as message segments, before being transmitted by a UE or LS. Each message segment may, for example, be a well formed positioning protocol message. For example, in the case of LPP, each LPP message segment may be a well formed LPP message according to the Abstract Syntax Notation One (ASN.1) definition of LPP in 3GPP TS 36.355 and may include the same LPP transaction identifier (ID) as each of the other LPP message segments. However, each message segment may include only a subset of the information that the entire prospective positioning protocol message would include, without segmentation. In addition, the total information contained in all the message segments may correspond to (e.g. may be the same as) the information that would have been included in the prospective positioning protocol message.

For some positioning protocols (e.g. LPP), the receiver of a set of two or more message segments may need to be aware that received message segments correspond to a larger positioning protocol message that was segmented prior to transmission. For example, the receiver may need to wait until all the message segments have been received before processing and taking action based on all the received message segments. Conversely, if a receiver is not aware that a message segment is part of a larger prospective positioning protocol message, the receiver may process and take action based on the received message segment which may not be optimal or may not be the action intended by the sender of the message segment. This may cause a problem, immediately or possibly later when one or more subsequent message segments are received. As an example, in the case of LPP, if an LS (e.g. E-SMLC) needs to segment a prospective LPP Request Location Information (RLI) message into two or more LPP RLI message segments, a receiving UE which receives the first LPP RLI message segment, and is not aware that more LPP RLI message segments will follow, may start to obtain location related measurements requested by the first LPP RLI. When the UE later receives the second LPP RLI message segment, the UE may determine an error if the second LPP RLI message segment contains the same LPP transaction ID as the first LPP message segment according to rules in 3GPP TS 36.355 and may then discard (e.g. ignore) the second LPP RLI message segment and/or abort location measurements for the first LPP RLI message segment. Alternatively, the UE might treat the second LPP RLI message segment as a different transaction to the first LPP RLI message segment and may then obtain separate location information requested by the second LPP RLI message segment and return this to the LS separately from location information returned to the LS for the first LPP LI message segment, which may cause a problem for the LS. However, if the UE is aware that the first LPP RLI message segment is a message segment and not a complete non-segmented LPP message, the UE can wait to receive the second (and any additional) LPP RLI message segments after the first LPP RLI message segment before starting to obtain location measurements requested by these message segments. Alternatively, the UE may start to obtain location measurements requested by the first LPP RLI message segment when this is received by the UE but may be ready to obtain additional location measurements requested by the second and any additional LPP RLI message segments when these are later received by the UE.

In the case of LPP, a similar problem to that just described for an LPP RLI may occur when a prospective LPP Provide Location Information (PLI) message to be transmitted by a UE to an LS (e.g. E-SMLC) exceeds a message size limit and needs to be segmented into two or more LPP PLI message segments. In this case, if an LS (e.g. E-SMLC) is not aware that a first LPP PLI message segment will be followed by additional LPP PLI message segments, the LS may attempt to obtain a location estimate for the UE based only on location information included in the first LPP PLI message segment, which may result in a less accurate location estimate or possibly no location estimate compared to waiting to obtain a location estimate from location information contained in all the LPP PLI message segments after these have all been received the LS. With LPP, a LS can sometimes be aware that an LPP message segment is not the final message segment from absence of an end of transaction indication in the LPP message segment. However, this may only be used when an LS receives LPP PLI messages segments for a final location and may not be usable for a non-final location—e.g. when an LS has requested periodic location information from a UE. Due to these problems, if may be necessary that the receiver of LPP message segments be aware that LPP message segments are being received, in order to wait until all LPP message segments have been received before taking any final actions.

Similar problems to those just described for an LPP RLI and LPP PLI message may also arise for an LPP Provide Assistance Data (PAD) message in the case that an LPP PAD message is segmented by an LS. A UE that receives an LPP PAD message segment from an LS can be aware that more assistance data will follow from the lack of an end transaction flag. However, in an LPP periodic assistance data delivery procedure that is used to support UE location (e.g. using Real Time Kinematics (RTK)), a UE could receive an LPP PAD message segment and not know or be aware whether further LPP PAD message segments will follow soon after (e.g. within 50-200 milliseconds) or only after some longer time period (e.g. a few seconds or more).

Depending on the circumstance, the UE, LS, or both, may be equipped to segment and/or to receive segmented positioning protocol (e.g. LPP) messages. To enable the sender of a positioning protocol (e.g. LPP) message to know in advance that a receiver supports receiving segmented messages (and thereby avoid problems such as those described above), one or more capability flags can be included in one or more positioning protocol messages to indicate this capability. For example, in the case of LPP, one or more capability flags may be included in an LPP Request Capabilities message (e.g., sent by an LS to a UE) to indicate to the UE an LS capability to support receiving and/or sending LPP message segments. Similarly, one or more capability flags may be included in an LPP Provide Capabilities message (e.g. sent by a UE to indicate to an LS) to indicate a UE capability to support sending and/or receiving LPP message segments. When an LPP message is segmented, an LPP message segment can be indicated using other flags, such as by including one flag in an LPP message segment to indicate a non-final message segment, and a different flag to indicate a final message segment.

As described in more detail herein, embodiments may include additional features, depending on desired functionality. For example, in the case of LPP, since each LPP message segment may be a well formed LPP message, there could be duplication of some information which, due to LPP ASN.1 rules, may appear in more than one LPP message segment. Thus, according to some embodiments, rules can be defined in LPP requiring that any duplicated information be identical or at least consistent (e.g. not contradictory). Additionally or alternatively, a UE or LS that supports segmentation could switch off support (e.g. indicate no support of segmentation) when delay needs to be limited or when congested. When a first entity (e.g. UE or server) that supports segmentation when sending an LPP message has an LPP session with a second entity not supporting segmentation when receiving an LPP message, the first entity may not segment LPP messages which are sent, but may instead reduce the information content in an LPP message which is sent, if needed to ensure the LPP message is less than a permitted maximum size (e.g. such as 8188 octets in the case of limitation due to PDCP).

FIG. 1 is a diagram illustrating a network architecture 100 for location support of a UE 102 that, according to an embodiment, may be used to implement the techniques for segmenting LPP messages described herein. The network architecture 100 may be referred to as an Evolved Packet System (EPS). As illustrated, the network architecture 100 may include a UE 102, an Evolved Universal Mobile Telecommunications Service (UMTS) Terrestrial Radio Access Network (E-UTRAN) 120, and an Evolved Packet Core (EPC) 130. The E-UTRAN 120 and the EPC 130 may be part of a Visited Public Land Mobile Network (VPLMN) that is a serving network for UE 102 and communicates with a Home Public Land Mobile Network (HPLMN) 140 for UE 102. The VPLMN E-UTRAN 120, VPLMN EPC 130 and/or HPLMN 140 may interconnect with other networks. For example, the Internet may be used to carry messages to and from different networks such as the HPLMN 140 and the VPLMN EPC 130. For simplicity these networks and associated entities and interfaces are not shown. As shown, the network architecture 100 provides packet-switched services to UE 102. However, as those skilled in the art will readily appreciate, the various concepts presented throughout this disclosure may be extended to networks providing circuit-switched services.

The UE 102 may be any electronic device configured for Narrow Band Internet of Things (IoT) (NB-IoT) and/or LTE radio access. The UE 102 may be referred to as a device, a wireless device, a mobile terminal, a terminal, a mobile station (MS), a mobile device, a Secure User Plane Location (SUPL) Enabled Terminal (SET) or by some other name and may correspond to (or be part of) a smart watch, digital glasses or other head-mounted display, fitness monitor, smart car, smart appliance, cellphone, smartphone, laptop, tablet, personal digital assistant (PDA), personal media player, tracking device, control device, or some other portable or moveable device. A UE 102 may comprise a single entity or may comprise multiple entities such as in a personal area network where a user may employ audio, video and/or data I/O devices and/or body sensors and a separate wireline or wireless modem. Typically, though not necessarily, a UE 102 may support wireless communication with one or more types of Wireless Wide Area Network (WWAN) such as a WWAN supporting Global System for Mobile Communications (GSM), Code Division Multiple Access (CDMA), Wideband CDMA (WCDMA), LTE, NB-IoT, Enhanced Machine Type Communications (eMTC) also referred to as LTE category M1 (LTE-M), Fifth Generation (5G) New Radio (NR), High Rate Packet Data (HRPD), WiMAX™, etc. VPLMN EPC 130 combined with VPLMN E-UTRAN 120, and HPLMN 140, may be examples of a WWAN. A UE 102 may also support wireless communication with one or more types of Wireless Local Area Network (WLAN) such as a WLAN supporting IEEE 802.11 WiFi (also referred to as Wi-Fi) or Bluetooth® (BT). UE 102 may also support communication with one or more types of wireline network such as by using a Digital Subscriber Line (DSL), or packet cable for example. Although FIG. 1 shows only one UE 102, there may be many other UEs that can each correspond to UE 102.

The UE 102 may enter a connected state with a wireless communication network that may include the E-UTRAN 120 and EPC 130. In one example, UE 102 may communicate with a cellular communication network by transmitting wireless signals to, and/or receiving wireless signals from, a cellular transceiver, such as an evolved Node B (eNB) 104 in the E-UTRAN 120. The E-UTRAN 120 may include one or more additional eNBs 106. The eNB 104 provides user plane (UP) and control plane (CP) protocol terminations toward UE 102. The eNB 104 may be a serving eNB for UE 102 and may also be referred to as a base station, a base transceiver station, a radio base station, a radio transceiver, a radio network controller, a transceiver function, a base station subsystem (BSS), an extended service set (ESS), an NR NodeB (gNB) or by some other suitable terminology. The UE 102 also may transmit wireless signals to, or receive wireless signals from, a local transceiver (not shown in FIG. 1), such as an access point (AP), femtocell, Home Base Station, small cell base station, Home Node B (HNB) or Home eNodeB (HeNB), which may provide access to a WLAN (e.g., IEEE 802.11 network), a wireless personal area network (WPAN, e.g., Bluetooth network) or a cellular network (e.g., an LTE network or other WWAN such as those discussed in the next paragraph). Of course it should be understood that these are merely examples of networks that may communicate with a mobile device over a wireless link, and claimed subject matter is not limited in this respect.

Examples of network technologies that may support wireless communication include NB-IoT, but may further include GSM, CDMA, WCDMA, LTE, NR, HRPD and eMTC radio types. NB-IoT, GSM, WCDMA, LTE, eMTC and NR are technologies defined by (or being defined by) 3GPP. CDMA and HRPD are technologies defined by the 3rd Generation Partnership Project 2 (3GPP2). Cellular transceivers, such as eNBs 104 and 106, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

The eNBs 104 and 106 are connected by an interface (e.g., the 3GPP S1 interface) to the VPLMN EPC 130. The EPC 130 includes a Mobility Management Entity (MME) 108, and a Serving Gateway (SGW) 112 through which data (e.g., Internet Protocol (IP) packets) to and from UE 102 may be transferred. The MME 108 may be the serving MME for UE 102 and is then the control node that processes the signaling between UE 102 and the EPC 130 and supports attachment and network connection of UE 102, mobility of UE 102 (e.g., via handover between network cells and tracking areas) as well as establishing and releasing data bearers on behalf of UE 102. The MME 108 may also support User Plane (UP) data transfer to and from UE 102 using a 3GPP Cellular IoT (CIoT) feature known as CIoT Control Plane (CP) optimization in which data packets are transferred to and from the UE via MME 108, rather than by bypassing MME 108, in order to avoid the overhead of establishing and releasing data bearers for UE 102. Generally, MME 108 provides bearer and connection management for UE 102 and may be connected to the SGW 112, the eNBs 104 and 106, an Enhanced Serving Mobile Location Center (E-SMLC) 110 and a Visited Gateway Mobile Location Center (V-GMLC) 116 in the VPLMN EPC 130.

The E-SMLC 110 may be an LS that supports location of UE 102 using the 3GPP control plane (CP) location solution defined in 3GPP technical specifications (TSs) 23.271 and 36.305 and may exchange LPP messages, and/or messages for LPP combined with the LPP Extensions (LPPe) protocol defined by the Open Mobile Alliance (OMA) (which may be referred to as LPP/LPPe), with UE 102 as part of a CP location session. The V-GMLC 116, which may also be referred to simply as a Gateway Mobile Location Center (GMLC), may provide access on behalf of an external client (e.g., external client 150) or another network (e.g., HPLMN 140) to the location of UE 102. The external client 150 may be a web server or remote application that may have some association with UE 102 (e.g., may be accessed by a user of UE 102 via VPLMN E-UTRAN 120, VPLMN EPC 130 and HPLMN 140). The external client 150 may also be a server, application or computer system providing a location service to some other user or users which may include obtaining and providing the location of UE 102 (e.g., to enable a service such as friend or relative finder, asset tracking or child or pet location).

As illustrated, the HPLMN 140 includes a Home GMLC (H-GMLC) 148 that may be connected to the V-GMLC 116 (e.g., via the Internet), as well as a Packet Data Network Gateway (PDG) 114 that may be connected to the SGW 112 (e.g., via the Internet). The PDG 114 may provide UE 102 with Internet Protocol (IP) address allocation and IP and other data access to external networks (e.g., the Internet) and to external clients (e.g., external client 150) and external servers, as well as other data transfer related functions. In some cases, PDG 114 may be located in VPLMN EPC 130 and not in HPLMN 140 when UE 102 receives local IP breakout from VPLMN EPC 130. The PDG 114 may be connected to a location server (LS), such as a Home SUPL Location Platform (H-SLP) 118. The H-SLP 118 may support the SUPL UP location solution defined by OMA and may support location services for UE 102 based on subscription information for UE 102 stored in H-SLP 118. In some embodiments of network architecture 100, a Discovered SLP (D-SLP) or Emergency SLP (E-SLP) (not shown in FIG. 1), in or accessible from VPLMN EPC 130, may be used to locate UE 102 using the SUPL UP solution. H-SLP 118 and E-SMLC 110 in network architecture 100 are both examples of an LS that may employ the LPP and/or LPP/LPPe protocols for positioning of UE 102.

In a CP location solution, such as the 3GPP CP location solution defined in 3GPP TS 23.271 and TS 36.305, signaling (e.g. including LPP, LPP/LPPe and other messages) to support location of UE 102 may be transferred between participating entities (e.g. V-GMLC 116, MME 108, E-SMLC 110, eNB 104 and UE 102) using existing signaling interfaces and protocols for VPLMN EPC 130 and E-UTRAN 120. In contrast, in a UP location solution such as SUPL, signaling (e.g. such as SUPL messages carrying embedded LPP and/or LPP/LPPe messages) to support location of UE 102 may be transferred between participating entities (e.g. UE 102 and H-SLP 118) using data bearers (e.g. using the Internet Protocol (IP)).

The H-GMLC 148 may be connected to a Home Subscriber Server (HSS) 145 for UE 102, which is a central database that contains user-related and subscription-related information for UE 102. H-GMLC 148 may provide location access to UE 102 on behalf of external clients such as external client 150. One or more of H-GMLC 148, PDG 114, and H-SLP 118 may be connected to external client 150, e.g., through another network, such as the Internet. In some cases, a Requesting GMLC (R-GMLC) located in another PLMN (not shown in FIG. 1) may be connected to H-GMLC 148 (e.g., via the Internet) in order to provide location access to UE 102 on behalf of external clients connected to the R-GMLC. The R-GMLC, H-GMLC 148 and V-GMLC 116 may support location access to UE 102 using the 3GPP CP solution defined in 3GPP TS 23.271.

It should be understood that while a VPLMN (comprising VPLMN E-UTRAN 120 and VPLMN EPC 130) and a separate HPLMN 140 are illustrated in FIG. 1, both PLMNs (networks) may be the same PLMN. In that case, (i) H-SLP 118, PDG 114, and HSS 145 may be in the same network (EPC) as MME 108 and E-SMLC 110, and (ii) V-GMLC 116 and H-GMLC 148 may be the same GMLC.

In particular implementations, UE 102 may have circuitry and processing resources capable of obtaining location related measurements (also referred to as location measurements), such as measurements for signals received from Global Navigation Satellite System (GNSS) or other Satellite Positioning System (SPS) space vehicles (SVs) 160, measurements for signals received from cellular transceivers such as eNBs 104 and 106, and/or measurements for signals received from local transceivers. UE 102 may further have circuitry and processing resources capable of computing a position fix or estimated location of UE 102 based on these location related measurements. In some implementations, location related measurements obtained by UE 102 may be transferred to an LS, such as E-SMLC 110 or H-SLP 118, after which the LS may estimate or determine a location for UE 102 based on the measurements.

Location related measurements obtained by UE 102 may include measurements of signals received from SVs 160 belonging to an SPS or Global Navigation Satellite System (GNSS) such as GPS, GLONASS, Galileo or Beidou and/or may include measurements of signals received from terrestrial transmitters fixed at known locations (e.g., such as eNB 104, eNB 106 or other local transceivers). UE 102 or a separate LS (e.g., E-SMLC 110 or H-SLP 118) may then obtain a location estimate for UE 102 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (ECID), WLAN (also referred to as WiFi), or combinations thereof. In some of these techniques (e.g., A-GNSS, AFLT and OTDOA), pseudoranges or timing differences may be measured by UE 102 relative to three or more terrestrial transmitters fixed at known locations or relative to four or more SVs 160 with accurately known orbital data, or combinations thereof, based at least in part, on pilot signals, navigation signals, positioning reference signals (PRS) or other positioning related signals transmitted by the transmitters or SVs 160 and received at UE 102. Here, LSs, such as E-SMLC 110 or H-SLP 118, may be capable of providing positioning assistance data (AD) to UE 102 including, for example, information regarding signals to be measured by UE 102 (e.g., expected signal timing, signal coding, signal frequencies, signal Doppler), locations and/or identities of terrestrial transmitters and/or associated cell antennas, and/or signal, timing and orbital information for GNSS SVs 160 to facilitate positioning techniques such as A-GNSS, AFLT, OTDOA, ECID and WLAN. The facilitation may include improving signal acquisition and measurement accuracy by UE 102 and/or, in some cases, enabling UE 102 to compute its estimated location based on the location measurements. For example, an LS may comprise an almanac (e.g., a Base Station Almanac (BSA)) which indicates the locations and identities of cellular transceivers and transmitters (e.g., eNBs 104 and 106) and/or local transceivers and transmitters in a particular region or regions such as a particular venue, and may further contain information descriptive of signals transmitted by these transceivers and transmitters such as signal power, signal timing, signal bandwidth, signal coding and/or signal frequency.

In the case of ECID, a UE 102 may obtain measurements of signal strength (e.g., Received Signal Strength Indication (RSSI) or Reference Signal Received Power (RSRP)) for signals received from cellular transceivers (e.g., eNBs 104, 106) and/or local transceivers and/or may obtain a Signal-to-Noise Ratio (SN), a Reference Signal Received Quality (RSRQ), and/or a Round Trip signal propagation Time (RTT) between UE 102 and a cellular transceiver (e.g., eNB 104 or 106) or a local transceiver. A UE 102 may transfer these measurements to an LS (e.g., E-SMLC 110 or H-SLP 118) to determine a location for UE 102, or in some implementations, UE 102 may use these measurements together with assistance data (e.g., terrestrial almanac data) received from an LS or from a cellular transceiver (e.g. eNB 104) to determine a location for UE 102 using ECID.

In the case of OTDOA, UE 102 may measure a Reference Signal Time Difference (RSTD) between signals, such as a Position Reference Signal (PRS) and/or Cell specific Reference Signal (CRS), received from nearby transceivers or base stations (e.g., eNBs 104 and 106). An RSTD measurement may provide the time of arrival difference between signals (e.g., CRS or PRS) received at UE 102 from two different transceivers (e.g., an RSTD between signals received from eNB 104 and from eNB 106). The UE 102 may return the measured RSTDs to an LS (e.g., E-SMLC 110 or H-SLP 118) which may compute an estimated location for UE 102 based on known locations and known signal timing for the measured transceivers. In some implementations of OTDOA, the signals used for RSTD measurements (e.g., PRS or CRS signals) may be accurately synchronized by the transceivers or transmitters to a common universal time such as Global Positioning System (GPS) time or coordinated universal time (UTC), e.g., using a GPS receiver at each transceiver or transmitter to accurately obtain the common universal time.

In the case of A-GNSS, a UE 102 may obtain measurements of Doppler, pseudorange, code phase and/or carrier phase for one more SVs 160 for one or more GNSSs. In the case of WLAN positioning, a UE 102 may obtain the identities of one or more visible WiFi APs and possibly measurements for beacon frames and/or other signals transmitted from visible WiFi APs, such as measurements of RSSI and/or RTT. As described above for ECID and OTDOA, these measurements may be transferred to an LS (e.g. E-SMLC 110 or H-SLP 118) to compute a location for UE 102 or UE 102 may compute the location itself based on AD (e.g. AD for SVs 160 or WLAN APs) received from an LS, cellular transceivers or from the transmitters themselves (e.g. from SVs 160). In some implementations hybrid combinations of two or more position methods may be used by an LS and UE 102 to obtain a location for UE 102.

Position methods such as A-GNSS, OTDOA, AFLT, ECID and WLAN, as described above, may be referred to as downlink (DL) position methods because they are supported by UEs such as UE 102 based on measurements by the UE of downlink signals transmitted from terrestrial transmitters (e.g., eNBs 104 and 106) and/or SPS SVs (e.g., SVs 160). In contrast, with an uplink (UL) position method, an entity on the network side (e.g., eNB 104 or eNB 106) may measure uplink signals transmitted by a UE (e.g., UE 102) in order to obtain a location estimate for the UE. The measurements for an UL position method may then be transferred to an LS (e.g., E-SMLC 110) using the LPP Annex (LPPa) protocol defined by 3GPP in TS 35.455 in order to enable the LS to determine a location of the UE.

An estimate of a location of a UE 102 may be referred to as a location, location estimate, location fix, fix, position, position estimate or position fix, and may be geodetic, thereby providing location coordinates for UE 102 (e.g., latitude and longitude) which may or may not include an altitude component (e.g., height above sea level, height above or depth below ground level, floor level or basement level). Alternatively, a location of UE 102 may be expressed as a civic location (e.g., as a postal address or the designation of some point or small area in a building such as a particular room or floor). A location of a UE 102 may also include an uncertainty and may then be expressed as an area or volume (defined either geodetically or in civic form) within which UE 102 is expected to be located with some given or default probability or confidence level (e.g., 67% or 95%). A location of a UE 102 may further be an absolute location (e.g., defined in terms of a latitude, longitude and possibly altitude and/or uncertainty) or may be a relative location comprising, for example, a distance and direction or relative X, Y (and Z) coordinates defined relative to some origin at a known absolute location. In the description contained herein, the use of the term location may comprise any of these variants unless indicated otherwise. Measurements (e.g., obtained by UE 102 or by another entity such as eNB 104) that are used to determine (e.g., calculate) a location estimate for UE 102 may be referred to as measurements, location measurements, location related measurements, positioning measurements or position measurements and the act of determining a location for UE 102 may be referred to as positioning of UE 102 or locating UE 102.

For downlink position methods and possibly for some uplink position methods, a UE 102 and a LS (e.g., E-SMLC 110 or possibly H-SLP 118) may need to exchange positioning protocol messages, such as messages for LPP. However, a transport protocol used to transport LPP messages between the UE 102 and LS may impose size limits that some LPP messages may exceed. For example, the PDCP protocol that is used to transport messages (e.g. LPP messages) between the UE 102 and eNB 104 may impose an overall limit (e.g. for protocols above PDCP) of 8188 octets in the case of LTE access by UE 102 and 1600 octets in the case of NB-IoT access by UE 102. But this limit may be exceeded under current LPP standards. For example, when sending an LPP Request Assistance Data (AD) message to the E-SMLC 110, for instance, the LPP protocol in 3GPP Release 14 allows the UE 102 to include up to 2048 WLAN Access Point (AP) addresses (for APs for which UE 102 already has AD), each identified using a six octet address. This would result in 12,288 octets for the addresses alone, far exceeding the maximum message size limit of the PDCP protocol used to relay LPP messages between the UE 102 and eNB 104. In another example, an LPP Provide Assistance Data message sent by an LS to a UE 102 to provide OTDOA assistance data for 24 neighbor cells could be up to around 3700 octets in size, which would exceed the PDCP limit for NB-IoT. Thus, as previously indicated, techniques provided herein allow for a UE 102, and/or LS (e.g., E-SMLC 110 or H-SLP 118) to segment LPP messages and to indicate a capability to send and/or to receive segmented LPP messages.

The network architecture 100 shown in FIG. 1 may apply to UE 102 wireless access to VPLMN E-UTRAN 120 and VPLMN EPC 130 using LTE or NB-IoT. However, other similar network architectures may exist in which a UE 102 accesses other types of radio access network (RAN) and/or other types of core network. For example, when UE 102 uses an NR Radio Access Technology (RAT), UE 102 may access a Next Generation Radio Access Network (NG-RAN) and a 5G Core Network (5GCN) which may replace E-UTRAN 120 and EPC 130, respectively, in network architecture 100. In this case, some network elements for EPC 130 shown in FIG. 1 may be different. For example, MME 108 may be replaced by an Access and Mobility Management Function (AMF) and E-SMLC 110 may be replaced by an LS supporting a CP location solution for NR wireless access such as a Location Management Function (LMF). In the description of the various techniques below, it may therefore be possible to substitute an AMF for MME 108 and an LMF for E-SMLC 110 in examples where UE 108 has NR RAT access rather than NB-IoT or LTE RAT access. Similarly, other positioning protocols may be used from LPP such as LPPe or an NR Positioning Protocol (NPP) for a UE 102 with NR radio access. Therefore, techniques described herein for supporting segmentation of LPP messages may also be applicable to segmenting messages for other positioning protocols such as LPPe or NPP.

Figure 2:
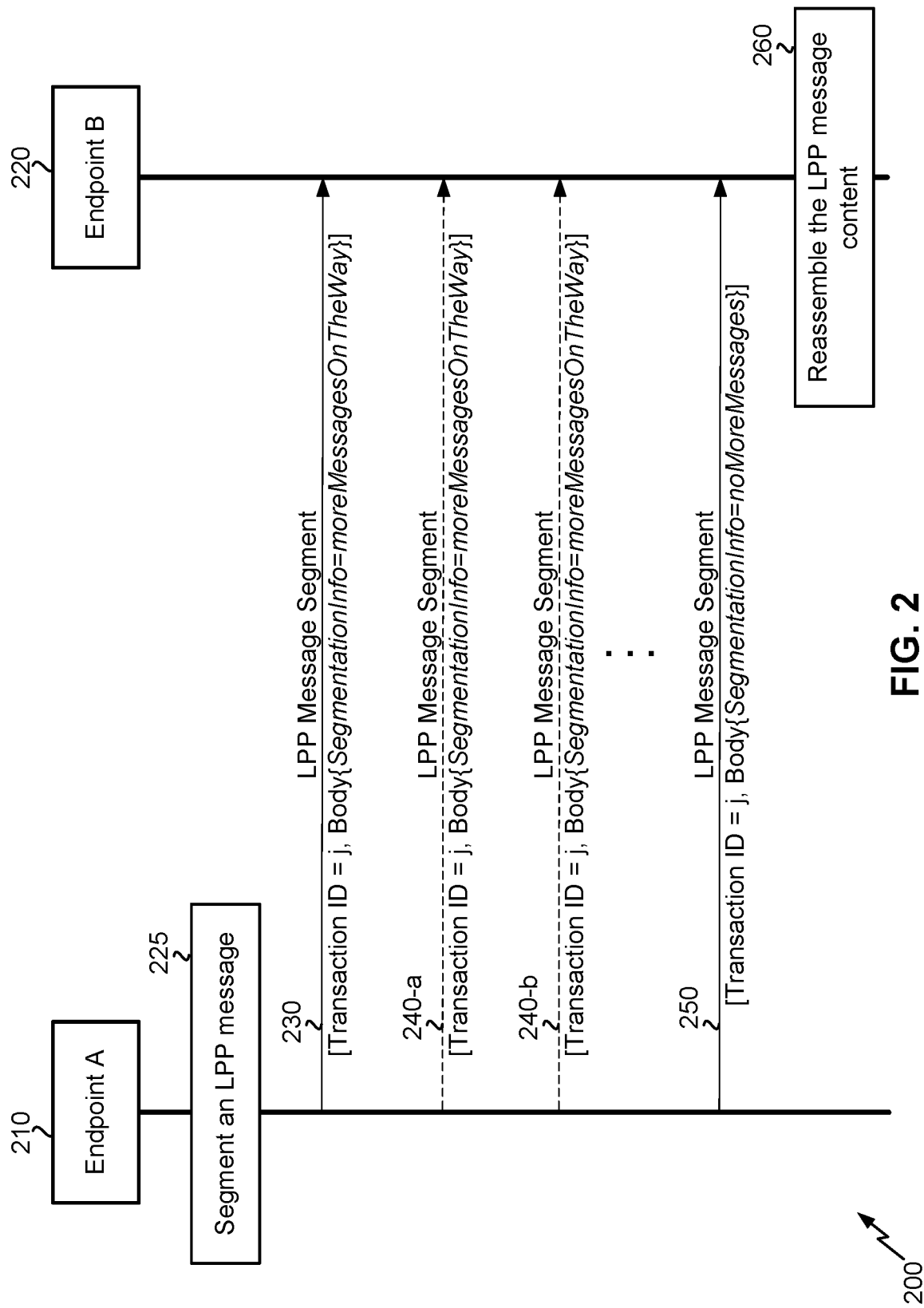
FIGS. 2-6 are signaling flow diagrams showing different aspects of a location session between a UE and an Enhanced Serving Mobile Location Center (E-SMLC), in which LPP message segmentation is used, according to embodiments.

FIG. 2 is a diagram of a signaling flow 200 for a location session or part of a location session between an Endpoint A 210 and an Endpoint B 220 in which LPP message segmentation is used. Either one of Endpoint A 210 or Endpoint B 220 may correspond to UE 102 in network architecture 100 with the other of Endpoint A 210 or Endpoint B 220 corresponding to E-SMLC 110 in network architecture 100. Although signaling flow 200 is described as applying to a location session between a UE 102 and E-SMLC 110 using LPP, as described elsewhere herein, the signaling flow 200 may apply to other entities (e.g. a UE 102 and an LMF or a UE 102 and H-SLP 118) and/or to other positioning protocols (e.g. LPP/LPPe or NPP). As illustrated in FIG. 2, LPP messages transferred at actions 230, 240-a, 240-b and 250 described below may be transferred between E-SMLC 110 and UE 102 via intermediate entities (not shown in FIG. 2), such as MME 108 and eNB 104 using transport protocols such as a Non-Access Stratum Protocol (NAS) protocol, an S1 Application Protocol (S1AP), a Location Services (LCS) Application Protocol (LCS-AP), a Radio Resource Control (RRC) protocol and a PDCP protocol. Alternatively, when signaling flow 200 applies to SUPL (e.g. with one of Endpoint A 210 or Endpoint B 220 corresponding to H-SLP 118 rather than to E-SMLC 110), each of the LPP messages described below may be embedded inside a SUPL message, such as a SUPL POS message, and transferred between UE 102 and H-SLP 118 via PDG 114, SGW 112 and eNB 104.

Signaling flow 200 may start at block 225, where Endpoint A 210 may need to transfer an LPP message to Endpoint B 220 which exceeds a maximum size threshold permitted by lower layer transport protocols for transfer of a single LPP message. Endpoint A 210 may then segment the LPP message at block 225 by dividing the information content of the prospective LPP message into two or more LPP message segments which may be each well formed LPP messages which use the same LPP message type as the original prospective LPP message and the same LPP transaction identifier (ID) (shown in FIG. 2 as an ID "j"). The segmentation at block 225 may just be of the information content for the prospective LPP message in some embodiments and the prospective LPP message itself may neither be created nor segmented. Endpoint A 210 may include a new LPP parameter, referred to here as a "SegmentationInfo field", in each LPP message segment. Endpoint A 210 may indicate, using the SegmentationInfo field, whether each LPP message segment is the final LPP message segment or whether more LPP message segments are on the way. The decision to use segmentation at block 225 by Endpoint A 210 rather than reduction of the content of the LPP message to avoid the need for segmentation, may be based on knowledge by Endpoint A 210 of the LPP segmentation capabilities of Endpoint B 220 as described further down in association with FIG. 3.

It is noted that the maximum size threshold for block 225 may be based on a smallest maximum message size limit for all transmission links used in the transport of LPP messages between Endpoint A 210 and Endpoint B 220, and may be adjusted to compensate for any additional information that is subsequently attached to the message by any transport protocol, if such information is included in the maximum message size limit. It can be noted, as mentioned previously, that the prospective LPP message to be sent from Endpoint A 210 to Endpoint B 220 may or may not actually be created by Endpoint A 210 prior to segmentation at block 225. In some instances of block 225, for example, LPP message segments may be created once it is determined that at least a portion of the information intended to be included in the prospective LPP message will exceed the maximum size threshold.

At action 230, Endpoint A 210 sends the first LPP message segment to Endpoint B 220 and includes the SegmentationInfo field set to "more Messages On The Way" to indicate that this is part of a segmented LPP message and that one of more additional LPP message segments will be transferred subsequently to deliver the entire LPP message content. Due to recognizing use of segmentation and that more LPP message segments are on the way, Endpoint B 220 may store the first LPP message segment when received following action 230.

At actions 240-a and 240-b, Endpoint A 210 may send additional LPP message segments to Endpoint B 220 (e.g. the second, third and possibly further segments) and includes the SegmentationInfo field set to "more Messages On The Way" in each LPP message segment to indicate that each LPP message segment is still part of the segmented LPP message started at action 230 and that one of more additional LPP message segments will be transferred subsequently to deliver the entire LPP message content. In some examples of signaling flow 200, action 240-b may not occur (e.g. for an LPP message comprising 2 or 3 segments) and in some instances action 240-a may not occur (e.g. for an LPP message comprising 2 segments). In other examples of signaling flow 200, actions additional to 240-a and 240-b may occur to transfer additional LPP message segments (e.g. for an LPP message comprising more than 4 segments). Due to recognizing use of segmentation and more LPP message segments on the way, Endpoint B 220 may store the additional LPP message segments when received for actions 240-a and 240-b (and for any additional similar actions).

At action 250, Endpoint A 210 sends the final LPP message segment to Endpoint B 220 and includes the SegmentationInfo field set to "no More Messages" to indicate that this is the final LPP message segment.

At block 260 and due to observing the indication of no more messages at action 250, Endpoint B 220 may assume that the complete LPP message has been received and may reassemble the original message content (e.g. by decoding each of the LPP message segments that were received and stored for actions 230, 240-a and 240-b as well as the LPP message segment received at action 250 and extracting and combining the information content of each of the decoded LPP message segments).

As part of signaling flow 200, Endpoint A 210 and Endpoint B 220 may apply the reliable transport rules for LPP specified in 3GPP TS 36.355 to each individual LPP message segment transferred at actions 230, 240-a, 240-b and 250, independently of the value of the SegmentationInfo field. For example, any one or more of the LPP message segments transferred at actions 230, 240-a, 240-b and 250 may: (i) include a distinct LPP sequence number; (ii) may request an LPP acknowledgment from Endpoint B 220 which may be sent by Endpoint B 220 prior to transfer of the next LPP message segment by Endpoint A 210; and (iii) may be retransmitted by Endpoint A 210 if an LPP acknowledgment is not received by Endpoint A 210 from Endpoint B 220 when requested by Endpoint A 210 in the LPP message segment. Endpoint A 210 and Endpoint B 220 may also employ the rules for setting common fields of an LPP message as specified in 3GPP TS 36.355 to each individual LPP message segment, independently of the value of the SegmentationInfo field. These common fields may comprise a transaction ID, transaction end flag, sequence number, and an acknowledgment.

Figure 3:
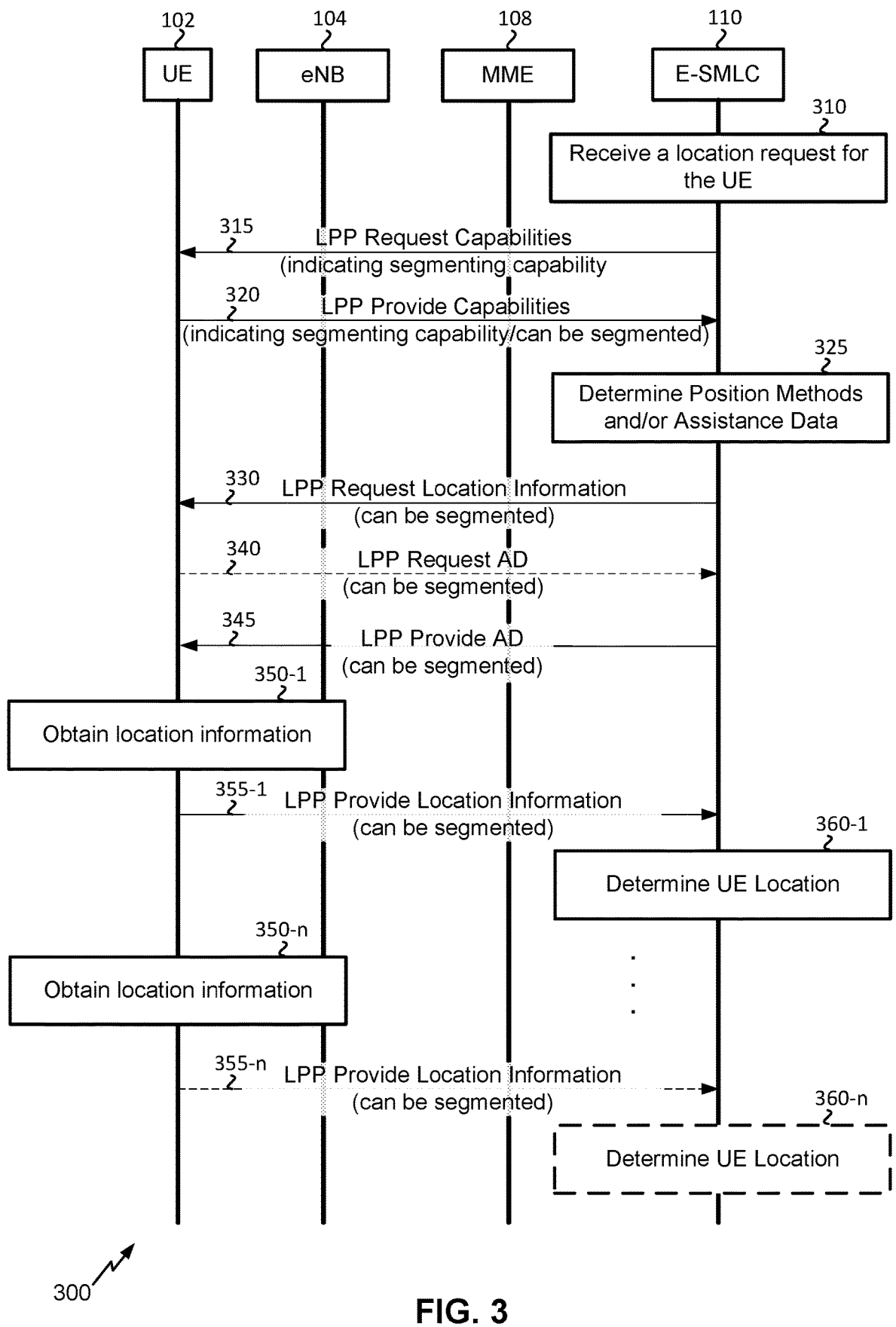

FIG. 3 is a diagram of a signaling flow 300 for a location session between a UE 102 and E-SMLC 110, illustrating an example of how message segmentation capabilities may be communicated, and when LPP messages can be segmented, according to an embodiment. It will be understood, however, that embodiments are not so limited. For instance, LPP message segmentation capabilities and/or LPP message segmentation may apply to different LPP messages in other circumstances or embodiments. As illustrated in FIG. 3, LPP messages transferred at actions 315, 320, 330, 340, 345, and 355 described below may be transferred between E-SMLC 110 and UE 102 via intermediate entities, such as MME 108 and eNB 104 using transport protocols such as a Non-Access Stratum Protocol (NAS), an S1 Application Protocol (S1AP), a Location Services (LCS) Application Protocol (LCS-AP), a Radio Resource Control (RRC) protocol and a PDCP protocol. Alternatively, when SUPL is used (e.g. with E-SMLC 110 in signaling flow 300 being replaced by H-SLP 118), each of the LPP messages described below may be embedded inside a SUPL message, such as a SUPL POS message, and relayed via entities and protocols appropriate to SUPL (e.g. such as PDG 114, SGW 112 and eNB 104).

Signaling flow 300 may start at block 310, where E-SMLC 110 receives a location request for UE 102. The location request may be received in any of a variety of ways, as a person of ordinary skill in the art will appreciate. For example, UE 102 may send a message to E-SMLC 110 that may prompt a location session with E-SMLC 110. This message may be triggered by an application executed by UE 102 (e.g., a navigation application), which may request a location estimate of the 102. In other scenarios, the location request may be received from MME 108 or from an external client (e.g., external client 150) via one or more other entities (e.g., V-GMLC 116, H-GMLC 148, MME 108).

E-SMLC 110 may then, as part of the location session, send to UE 102 an LPP Request Capabilities message at action 315, in which E-SMLC 110 requests the positioning capabilities of UE 102 including the position methods supported by UE 102 and, for each supported position method, an indication of the types of AD and types of location information (LI) that UE 102 is capable of using or providing. According to some embodiments, a flag may be included in the LPP Request Capabilities message by E-SMLC 110 to indicate whether or not E-SMLC 110 is capable of receiving segmented LPP messages from the UE 102, e.g. as exemplified for Endpoint B 220 in FIG. 2. In some embodiments, an additional or alternative flag may be included by E-SMLC 110 to indicate whether or not the E-SMLC 110 is capable of sending segmented LPP messages to the UE 102, e.g. as exemplified for Endpoint A 210 in FIG. 2. For example, each flag may comprise a single bit with a "one" value indicating that E-SMLC 110 has the associated capability and a "zero" value indicating that the E-SMLC 110 does not have the associated capability. The presence of one or both of these flags may also indicate that E-SMLC 110 is requesting the LPP segmentation capabilities of UE 102.

In response, UE 102 sends an LPP Provide Capabilities message at action 320 to E-SMLC 110, providing E-SMLC 110 with the LPP positioning capabilities of UE 102, e.g. including the position methods supported by UE 102 and, for each supported position method, an indication of the types of AD and/or types of LI that UE 102 is capable of using or providing.

UE 102 can also include an indication in the LPP Provide Capabilities message sent at action 320 that the UE 102 is capable of segmenting LPP messages. For example, UE 102 may include the indication in response to receiving an indication of E-SMLC 110 support for LPP message segmentation at action 315 as described above. In some embodiments, for example, a new flag can be added to the LPP Provide Capabilities message by UE 102, which can indicate to the E-SMLC 110 whether or not the UE 102 is capable of segmenting LPP messages and sending a segmented LPP message to E-SMLC 110, e.g. as exemplified for Endpoint A 210 in FIG. 2. Another new flag may also or instead be added by UE 102 to indicate whether or not the UE 102 is capable of receiving segmented LPP messages from the E-SMLC 110, e.g. as exemplified for Endpoint B 220 in FIG. 2. Depending on desired functionality, the flag for indicating the capability of receiving segmented LPP messages may be different than the flag indicating the capability for segmenting LPP messages. In other embodiments, both of these capabilities may be indicated by a single flag. In one example, two separate flags may be used that each comprise a single bit with a "one" value indicating that UE 102 has the associated capability and a "zero" value indicating that the UE 102 does not have the associated capability. In the example illustrated in FIG. 3, one or both of these flags or capabilities may be indicated by UE 102 to the E-SMLC 110 in the LPP Provide Capabilities message at action 320.

In one example of action 320, if the LPP Provide Capabilities message to be sent at action 320 will exceed a maximum size threshold permitted by lower layer transport protocols and UE 102 supports segmentation of LPP messages towards E-SMLC 110 and E-SMLC 110 has indicated support of receiving segmented LPP messages at action 315, the UE 102 may segment the LPP Provide Capabilities message and transfer the message to E-SMLC 110 at action 320 as described for FIG. 2.

In response to receiving the LPP positioning capabilities of UE 102 at action 320, at block 325, E-SMLC 110 may (i) determine to use one or more position methods to obtain a location of UE 102 (e.g., one or more position methods indicated as supported by UE 102 at action 320), and/or (ii) determine suitable assistance data to send to UE 102 (e.g. assistance data needed for the one or more position methods determined at block 325 and/or assistance data indicated as supported by UE 102 at action 320). In one embodiment, at least part of the determination at block 325 may be based on the capabilities of UE 102 to support LPP message segmentation (as indicated at action 320) and/or on the capabilities of E-SMLC 110 to support LPP message segmentation (e.g. as indicated at action 315). For example, if UE 102 indicates that UE 102 does not support receiving segmented LPP messages, E-SMLC 110 may reduce the amount of assistance data determined at block 325 in order to avoid the need for segmentation at action 345 as described later. Conversely, if UE 102 indicates that UE 102 supports receiving segmented LPP messages, E-SMLC 110 may determine a larger quantity of assistance data at block 325 and may employ LPP segmentation at action 345 as described later. In another example, if UE 102 indicates that UE 102 does not support sending or receiving segmented LPP messages, E-SMLC 110 may determine not to use a position method at block 325 that would or could require segmentation of assistance data at action 345 as described later or segmentation of location information at action 355 as described later. Conversely, if UE 102 indicates that UE 102 supports sending and receiving segmented LPP messages, E-SMLC 110 may determine a position method at block 325 that would or could require segmentation of assistance data at action 345 as described later or segmentation of location information at action 355 as described later.

Based on the position method(s) determined at block 325, E-SMLC 110 sends an LPP Request Location Information (RLI) message to UE 102 at action 330. The LPP RLI message sent at action 330 may request location measurements and/or a location estimate from UE 102 using one or more the position methods determined at block 325. In one embodiment, a request for location measurements at action 330 may be based on the capabilities of UE 102 to support LPP message segmentation (as indicated at action 320) and/or on the capabilities of E-SMLC 110 to support LPP message segmentation (e.g. as indicated at action 315). For example, if UE 102 indicates that UE 102 does not support sending segmented LPP messages, E-SMLC 110 may reduce the number of location measurements requested at action 330 in order to avoid the need for segmentation by UE 102 at action 355 as described later. Conversely, if UE 102 indicates that UE 102 supports sending segmented LPP messages, E-SMLC 110 may increase the number of location measurements requested at action 330 and may receive the increased number of location measurements using LPP segmentation at action 355 as described later, which may enable more accurate location of UE 102. In one embodiment, the LPP RLI message sent at action 330 may request a series of two or more periodic or triggered location measurements or location estimates from UE 102, e.g. if the request for location at block 310 indicates a request for periodic or triggered reporting of location estimates for UE 102.

In one example of action 330, if the LPP RLI message to be sent at action 330 will exceed a maximum size threshold permitted by lower layer transport protocols and E-SMLC 110 supports segmentation of LPP messages towards UE 102 and UE 102 has indicated support of receiving segmented LPP messages at action 320, E-SMLC 110 may segment the LPP RLI message and transfer the message to E-SMLC 110 at action 330 as described for FIG. 2.

In order to support the location measurements or location estimate requested at action 330, UE 102 may optionally send an LPP Request Assistance Data (RAD) message to E-SMLC 110 at action 340 to request assistance data from E-SMLC 110 to assist UE 102 to obtain the location measurements and/or location estimate requested at action 330. In one embodiment, the assistance data requested at action 340 may be based in part on the capabilities of UE 102 to support LPP message segmentation (e.g. as indicated at action 320) and/or on the capabilities of E-SMLC 110 to support LPP message segmentation (e.g. as indicated at action 315). For example, if UE 102 does not support receiving segmented LPP messages or if E-SMLC 110 indicates at action 320 that E-SMLC 110 does not support sending segmented LPP messages, UE 102 may reduce the amount of assistance data requested at action 340 in order to avoid the need for segmentation at action 345 as described later. Conversely, if UE 102 supports receiving segmented LPP messages and E-SMLC 110 indicates at action 315 that E-SMLC supports sending segmented LPP messages, UE 102 may increase the amount of assistance data requested at action 340 and may employ LPP segmentation at action 345 as described later to receive the assistance data.

In one example of action 340, if the LPP RAD message to be sent at action 340 will exceed a maximum size threshold permitted by lower layer transport protocols and UE 102 supports segmentation of LPP messages towards E-SMLC 110 and if E-SMLC 110 has indicated support of receiving segmented LPP messages at action 315, the UE 102 may segment the LPP RAD message and transfer the message to E-SMLC 110 at action 340 as described for FIG. 2.

At action 345, E-SMLC 110 may send an LPP Provide AD (PAD) message to UE 102. The LPP PAD message may include some or all of the AD requested in the LPP RAD message sent at action 340 and/or the AD determined at block 325 and may assist UE 102 to obtain location information, at block 350 as described later. The information provided in the LPP PAD can vary, depending on the position method(s) determined at block 325 (e.g. A-GNSS, OTDOA, WLAN, ECID, etc.) and/or on the information available to E-SMLC 110. In one variant of the signaling flow 300, action 345 occurs before action 330 and action 340 does not occur.

In one example of action 345, if the LPP PAD message to be sent at action 345 will exceed a maximum size threshold permitted by lower layer transport protocols and E-SMLC 110 supports segmentation of LPP messages towards UE 102 and if UE 102 has indicated support of receiving segmented LPP messages at action 320, E-SMLC 110 may segment the LPP PAD message and transfer the message to E-SMLC 110 at action 345 as described for FIG. 2.

At block 350-1, UE 102 obtains the location measurements or location estimate requested at action 330. Optionally, the UE 102 may use assistance data received at action 345 to help obtain the location measurements and/or location estimate at block 350-1.

At action 355-1, the UE returns an LPP Provide Location Information (PLI) message to E-SMLC 110 that includes the location measurements or location estimate obtained at block 350-1. In one example of action 355-1, if the LPP PLI message to be sent at action 355-1 will exceed a maximum size threshold permitted by lower layer transport protocols and UE 102 supports segmentation of LPP messages towards E-SMLC 110 and E-SMLC 110 has indicated support of receiving segmented LPP messages at action 315, the UE 102 may segment the LPP PLI message and transfer the message to E-SMLC 110 at action 355-1 as described for FIG. 2.

At block 360-1, E-SMLC 110 may determine (or verify) the location of UE 102, using the location measurements or location estimate received in the LPP PLI message at action 355-1. The location of UE 102 may be subsequently returned (not shown) to the entity originating the request received at block 310.

In one embodiment of signaling flow 300, if E-SMLC 110 requests periodic or triggered location measurements or location estimates from UE 102 at action 330, UE 102 may repeat block 350-1 at one or more later times to obtain new location measurements or a new location estimate. For example, block 350-1 may be repeated at fixed periodic intervals in the case of periodic location or when certain trigger events are detected by UE 102 in the case of triggered location (e.g. such as UE 102 changing serving cell, entering or leaving a predefined area or moving by more than a threshold distance from a previous location). FIG. 3 shows one such repetition of block 350-1, denoted as 350-n.

Following the repetition of block 350-1 at block 350-n, the UE 102 returns an LPP Provide Location Information (PLI) message to E-SMLC 110 at action 355-n that includes the location measurements or location estimate obtained at block 350-n. In one example of action 355-n, if the LPP PLI message to be sent at action 355-n will exceed a maximum size threshold permitted by lower layer transport protocols and UE 102 supports segmentation of LPP messages towards E-SMLC 110 and E-SMLC 110 has indicated support of receiving segmented LPP messages at action 315, the UE 102 may segment the LPP PLI message and transfer the message to E-SMLC 110 at action 355-n as described for FIG. 2.

At block 360-n, E-SMLC 110 may determine (or verify) the location of UE 102, using the location measurements or location estimate received in the LPP PLI message at action 355-n. The location of UE 102 may be subsequently returned (not shown) to the entity originating the request received at block 310.

Additional repetitions of block 350-1 and actions 355-1 and 360-1 may occur (not shown in FIG. 3) as just described for block 350-n and actions 355-n and 360-n. The location procedure may terminate when a maximum duration or maximum number of location reports is attained or when canceled by E-SMLC 110 (not shown in FIG. 3).

Figure 4:
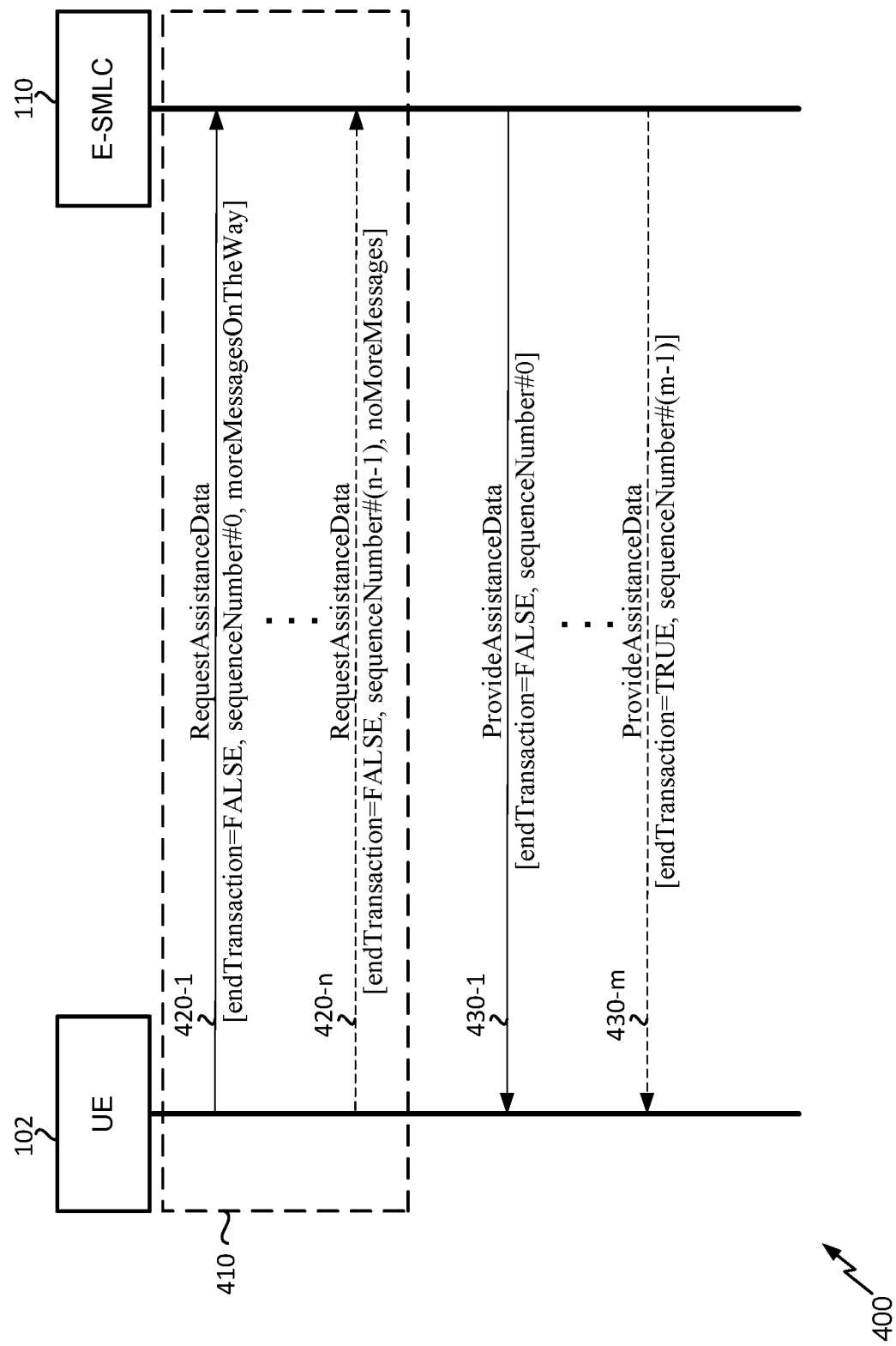

FIG. 4 is a diagram of a signaling flow 400 for part of a location session between a UE 102 and E-SMLC 110, illustrating an example of how LPP message segmentation may be used to request and provide assistance data to a UE 102. For example, the signaling flow 400 could be used to support actions 340 and 345 in signaling flow 300 when LPP message segmentation is used.

At block 410 in signaling flow 400, UE 102 sends an LPP Request Assistance Data (RAD) message to E-SMLC 110. In this case, it is assumed that the LPP RAD message size would exceed a maximum size threshold supported by lower layers (e.g. PDCP). Consequently, the UE 102 segments the LPP RAD message into n LPP message segments, where n equals 2 or more, which are sent to E-SMLC at actions 420-1 and 420-n in FIG. 4. For n greater than 2, action 420-1 would be repeated for the second up to $(n-1)^{st}$ LPP message segment (not shown in FIG. 4). For the first LPP message segment sent at action 420-1 and for each subsequent LPP message segment except the last one, the LPP message segment includes the "more Messages On The Way" flag as described for FIG. 2. The final LPP message segment sent at action 420-n includes the "no More Messages" flag. Each of the LPP message segments sent in block 410 may also include a distinct LPP sequence number as shown in FIG. 4. The E-SMLC 110 may store the first LPP message segment sent at action 420-1 and each subsequent LPP message segment except the last one based on inclusion of the "more Messages On The Way" flag and may reassemble the content of all the LPP message segments after receiving the final LPP message segment which can be recognized by E-SMLC 110 from inclusion of the "no More Messages" flag. The reassembled LPP message content may provide information on all the assistance data being requested by UE 102.

At action 430-1, the E-SMLC 110 responds by returning an LPP Provide Assistance Data (PAD) message to UE 102 containing some or all of the assistance data requested at block 410. E-SMLC 110 may also provide any not requested assistance data that E-SMLC 110 considers may be useful to UE 102. If action 430-m does not occur, the LPP PAD sent at action 430-1 may include an endTransaction parameter set to TRUE.

If the LPP PAD message sent at action 430-1 would exceed a maximum size threshold permitted by lower layer transport protocols, E-SMLC may segment the LPP PAD message and send the first segment at action 430-1. In this case, E-SMLC 110 may employ the same segmentation procedure used for block 410 (and as exemplified in FIG. 2) or may use a simpler segmentation procedure based on using an LPP end of transaction indication to indicate a final LPP message segment. FIG. 4 shows the simpler LPP segmentation procedure, although in other embodiments of FIG. 4, the segmentation procedure exemplified in FIG. 2 and block 410 could be used. With the simpler segmentation procedure, E-SMLC 110 sends the first and each subsequent LPP message segment as at action 430-1 with the endTransaction parameter set to FALSE, and sends the final ($m^{th}$) LPP message segment at action 430-m with the endTransaction flag set to TRUE. Due to the indication of the end of the LPP transaction at action 430-m, the UE 102 can know that all LPP message segments have been received and can then reassemble the content of all the LPP message segments to obtain the provided assistance data.

Figure 5:
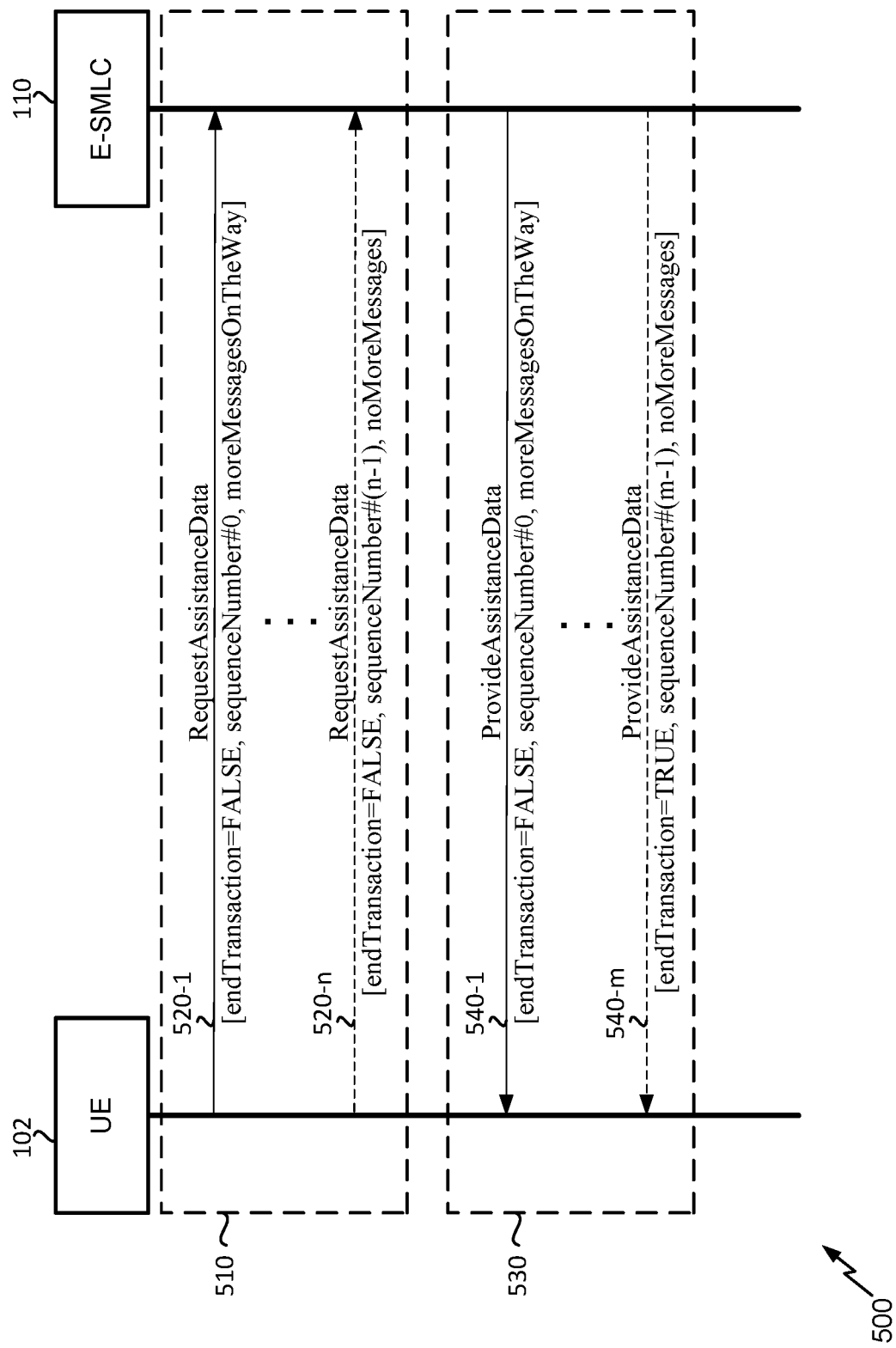

FIG. 5 is a diagram of a signaling flow 500 for part of a location session between a UE 102 and E-SMLC 110, illustrating an example of how LPP message segmentation may be used to request and provide assistance data to a UE 102. FIG. 5 is similar to FIG. 4 except that the "no More Messages" and "more Messages On The Way" flags are now used to indicate to UE 102 when all the assistance data requested by UE 102 has been delivered by E-SMLC 110.

At block 510 in signaling flow 500, UE 102 sends an LPP Request Assistance Data (RAD) message to E-SMLC 110 at actions 520-1 and 520-n, where action 520-1 would be repeated n-2 times for n greater than 2. Block 510 and actions 520-1 and 520-n may correspond to block 410 and actions 410-1 and 410-n in FIG. 4.

At block 530, the E-SMLC 110 responds by returning an LPP Provide Assistance Data (PAD) message to UE 102 containing some or all of the assistance data requested at block 510. As in FIG. 4 for actions 430-1 and 430-m, E-SMLC 110 segments the assistance data and sends the first and each subsequent LPP message segment as at action 540-1 with the endTransaction parameter set to FALSE, and sends the final ($m^{th}$) LPP message segment at action 540-m with the endTransaction flag set to TRUE. However, different to FIG. 4, E-SMLC also includes the SegmentationInfo field described for FIG. 2 in each LPP message segment sent at action 540-1 and 540-m. The SegmentationInfo field is set to indicate "more Messages On the Way" for the m-1 LPP message segments sent for the m-1 repetitions of action 540-1 and is set to indicate "no More Messages" for the final ($m^{th}$) LPP message segment sent at action 540-m. For example, the actions at block 530 may be used when assistance data is provided to UE 102 periodically by E-SMLC 110 and the endTransaction flag is set to FALSE (instead of TRUE) at action 540-m. UE 102 may use the received SegmentationInfo field to determine that all the assistance data has been received following action 540-m and may then use the received assistance data—e.g. to help obtain location measurements or a location estimate (e.g. as described for FIG. 3).

Figure 6:
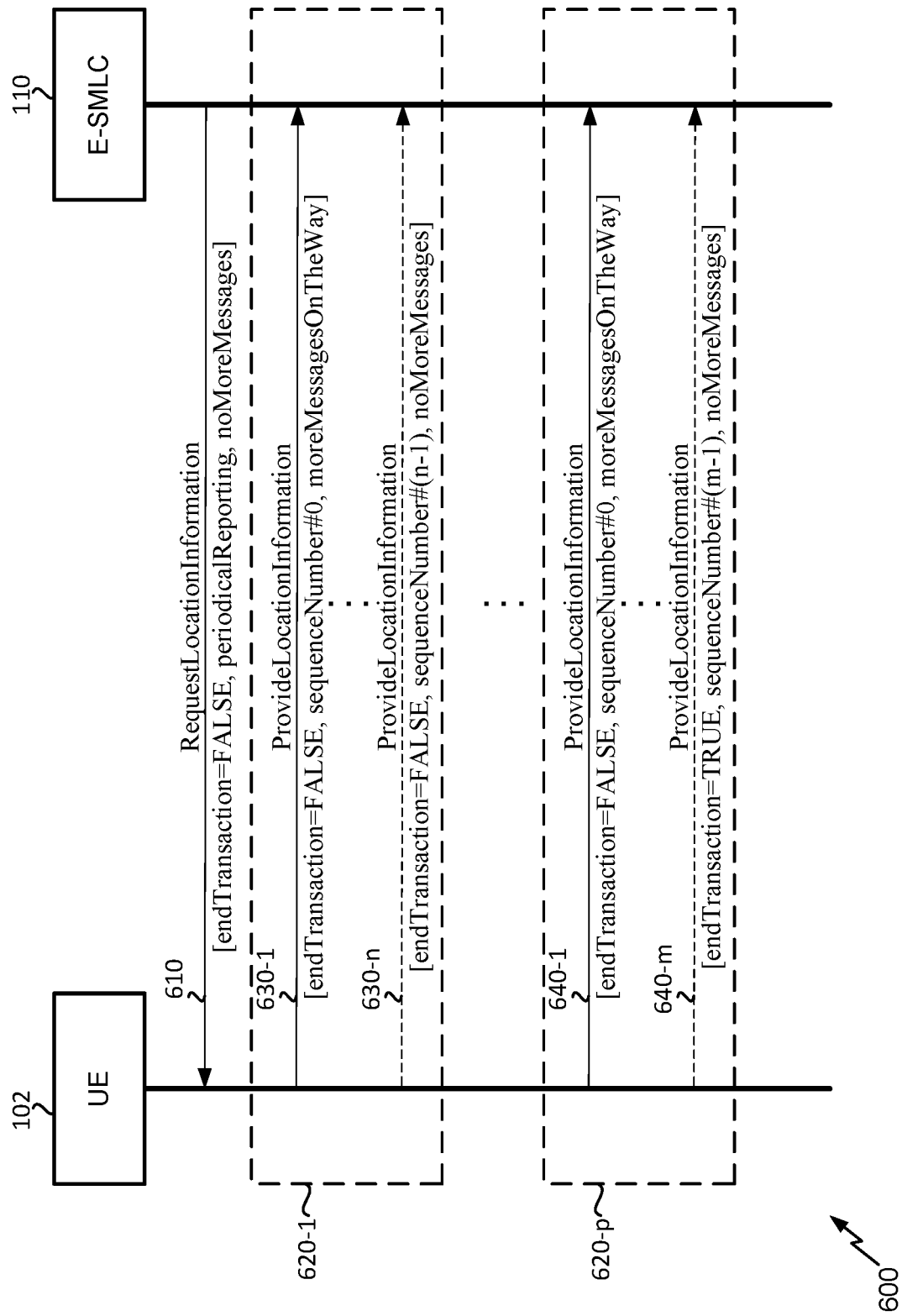

FIG. 6 is a diagram of a signaling flow 600 for part of a location session between a UE 102 and E-SMLC 110, illustrating an example of how LPP message segmentation may be used to provide location information to an E-SMLC 110. For example, the signaling flow 600 could be used to support actions 330, 355-1 and 355-n in signaling flow 300 when LPP message segmentation is used.

At action 610 in signaling flow 600, E-SMLC 110 sends an LPP Request Location Information (RLI) message to E-SMLC 110 to request UE 102 to provide location measurements and/or a location estimate to E-SMLC 110 at fixed periodic intervals.

At block 620-1, the UE 102 responds by returning an LPP Provide Location Information (PLI) message to E-SMLC 110 containing some or all of the location measurements and/or location estimate requested at action 610. In FIG. 6, it is assumed that the LPP PLI message to be sent at block 620-1 would exceed a maximum size threshold permitted by lower layer transport protocols. As a consequence, and assuming that UE 102 supports segmentation of LPP messages towards E-SMLC 110 and that E-SMLC 110 supports segmentation of LPP messages received from UE 102 (e.g. as indicated in an LPP Request Capabilities message sent to UE 102 by E-SMLC 110 as at action 315 in FIG. 3), UE 102 segments the intended LPP PLI message into n (n≥2) LPP PLI message segments (e.g. as described for FIG. 2). UE 102 then sends the first LPP PLI message segment at action 630-1, the second to the n-1' LPP PLI message segments by repeating action 630-1 n-2 times if n>2, and the final ($n^{th}$) LPP PLI message segment at action 630-n. For the first LPP PLI message segment sent at action 630-1 and for each subsequent LPP message segment except the last one, the LPP PLI message segment includes the SegmentationInfo field set to "more Messages On The Way" as described for FIG. 2. The final LPP PLI message segment sent at action 630-n includes the SegmentationInfo field set to "no More Messages". Each of the LPP message segments sent in block 620-1 may also include a distinct LPP sequence number and an endTransaction flag set to FALSE as shown in FIG. 6. The E-SMLC 110 may store the first LPP PLI message segment sent at action 630-1 and each subsequent LPP message segment except the last one based on inclusion of the "more Messages On The Way" flag and may reassemble the content of all the LPP PLI message segments after receiving the final LPP message segment at action 630-$n$ which can be recognized by E-SMLC 110 from inclusion of the "no More Messages" flag. The reassembled LPP PLI message content may be used by E-SMLC 110 to determine a location for UE 102 (e.g. as at block 360-1 in FIG. 3).

UE 102 may send further location measurements and/or a location estimate to E-SMLC 110 at subsequent fixed periodic intervals as requested by E-SMLC 110 at action 610. When segmentation needs to be used due to an LPP PLI message that would exceed a maximum size threshold permitted by lower layer transport protocols, actions similar to those for block 620-1 may be performed by UE 102. When a final set of location measurements and/or final location estimate needs to be sent by UE 102 to E-SMLC 110 using segmentation, UE 102 may perform actions 640-1 and 640-$m$ for block 620-$p$. The labelling in FIG. 6 assumes that UE 102 returns p (p≥2) separate sets of periodic location measurements and/or location estimates to E-SMLC 110 and that the final ($p^{th}$) set requires segmentation into m (m≥2) separate LPP PLI message segments. The m LPP PLI message segments are sent at actions 640-1 to 640-$m$ similarly to the n LPP PLI message segments sent at actions 630-1 to 630-$n$. This includes the inclusion of the SegmentationInfo field set to "more Messages On The Way" for the first m−1 LPP PLI message segments sent for m−1 repetitions of action 640-1 and inclusion of the SegmentationInfo field set to "no More Messages" for the final ($m^{th}$) LPP PLI message segment sent at action 640-$m$. However, unlike block 620-1, an endTransaction flag set to TRUE is included in the final ($m^{th}$) LPP PLI message segment sent at action 640-$m$. As described above for block 620-1, E-SMLC 110 may reassemble the content of all the LPP PLI message segments after receiving the final $m^{th}$ LPP message segment at action 640-$m$ which can be recognized by E-SMLC 110 from inclusion of the "no More Messages" flag or the endTransaction flag set to TRUE. The reassembled LPP PLI message content may be used by E-SMLC 110 to determine a final location for UE 102 (e.g. as at block 360-$n$ in FIG. 3).

A UE 102 or E-SMLC 110 that supports LPP message segmentation as described above in relation to FIGS. 2-6 may need to employ error detection procedures when LPP message segmentation is being used in order to detect and recover from possible errors introduced by the sender of an LPP message or LPP message segment. An example set of rules, labelled R1 to R8, to detect and recover from errors is described below. The rules may be applied in the order shown below by a UE 102 or E-SMLC 110, referred to below as a "receiver", which has received an LPP message or LPP message segment from a sender and is processing the message or message segment to determine possible errors.

Rule R1: attempt to decode the LPP message or message segment according to the ASN.1 encoding defined for LPP in 3GPP TS 36.355. If (i) decoding errors are encountered, (ii) the receiver cannot determine that the received message or message segment is an LPP Error or Abort message, (iii) the receiver can determine the LPP session and the LPP Transaction ID, (iv) the received message includes the SegmentationInfo field, and (v) the receiver has previously stored message segments for this LPP session and LPP Transaction ID, then the receiver shall discard all stored LPP message segments for this LPP session and LPP Transaction ID. In addition, when conditions (i) and (ii) are met, the receiver shall discard the received message, stop the error detection procedure, and return an LPP Error message to the sender and include the received LPP Transaction ID, if this was decoded, and a type of error.

Rule R2: if the message is a duplicate of a previously received message, discard the received message and stop the error detection procedure.

Rule R3: if the LPP Transaction ID matches the LPP Transaction ID for a procedure that is still ongoing at the receiver for the same LPP session and if the message type is invalid for the current state of the procedure, then: (i) abort the ongoing procedure; (ii) return an LPP Error message to the sender and include the received LPP Transaction ID and a type of error; (iii) if the message includes the SegmentationInfo field and the receiver has previously stored LPP message segments for this session and LPP Transaction ID, discard all stored LPP message segments for this LPP session and LPP Transaction ID; and (iv) discard the received message and stop the error detection procedure.

Rule R4: if the message includes the SegmentationInfo field, the receiver has previously stored LPP message segments for this LPP session and LPP Transaction ID, and the received message type is different to the stored message type, then: (i) return an LPP Error message to the sender and include the received LPP transaction ID and a type of error, (ii) discard the received message and all stored LPP message segments for this LPP session and LPP Transaction ID, and (iii) stop the error detection procedure.

Rule R5: if the message includes the SegmentationInfo field and if the SegmentationInfo field has the value "more Messages On The Way", store the received message. As an implementation option, the receiver of an LPP Provide Assistance Data or LPP Provide Location Information message may process the received message segment instead of storing the message segment.

Rule R6: if the message includes the SegmentationInfo field and if the SegmentationInfo field has the value "no More Messages", continue error detection and other processing for the received message and for any stored LPP message segments for this session and LPP Transaction ID.

Rule R7: if the message type is an LPP Request Capabilities and some of the requested information is not supported, then return any information that can be provided in a normal response to the sender.

Rule R8: if the message type is an LPP Request Assistance Data or LPP Request Location Information and some or all of the requested information is not supported, then return any information that can be provided in a normal response to the sender, which includes indications on other information that is not supported by the receiver.

Figure 7:
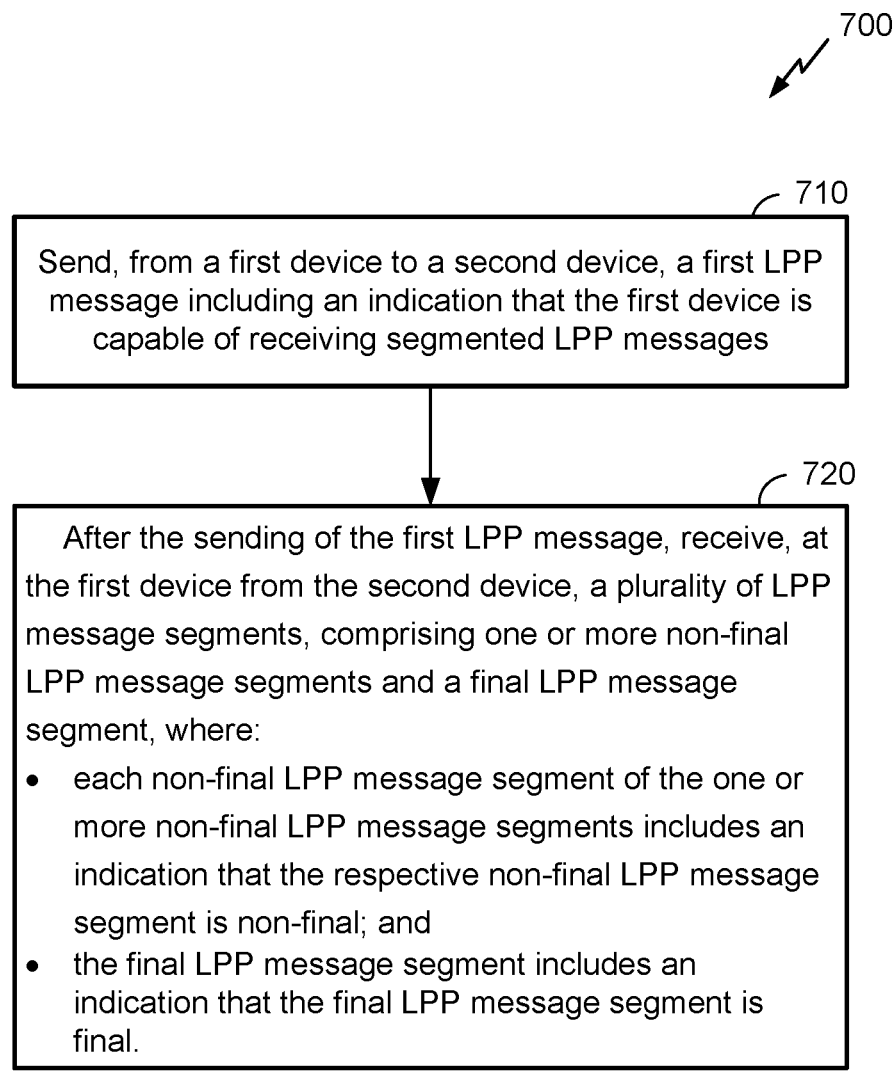
FIGS. 7 and 8 are process flow diagrams of methods of supporting LPP message segmentation in a location session, according to embodiments.

FIG. 7 is a process flow diagram 700 of a method of limiting the size of LPP messages in a location session, according to an embodiment. As with other figures appended hereto, FIG. 7 is provided as a non-limiting example. Alternative embodiments may add, omit, combine, rearrange, separate, and/or otherwise alter the functions as illustrated in FIG. 7. The method can be performed by a UE such as UE 102 or by an LS such as E-SMLC 110, H-SLP 118 or an LMF. Means for performing the functionality described in one or more of the blocks in FIG. 7 can include software and/or hardware components of a mobile device such as the UE 102 illustrated in FIG. 9 and/or a computer system, such as the computer system 1000 illustrated in FIG. 10, both of which are described in more detail below.

The method can begin at block 710, where a first LPP message is sent from a first device to a second device, where the first LPP message includes an indication that the first device is capable of receiving segmented LPP messages. As noted above, both a UE and an LS may send and/or receive segmented LPP messages. Thus, in some embodiments, the first device may comprise an E-SMLC (e.g. E-SMLC 110) or an LMF, and the second device may comprise a UE (e.g. UE 102). Alternatively, the first device may comprise a UE (e.g. UE 102) and the second device may comprise an E-SMLC (e.g. E-SMLC 110) or an LMF.

As previously noted, different LPP messages may be segmented and/or indicate capabilities for sending and/or receiving segmented messages as desired. In some embodiments, the first LPP message may comprise an LPP Request Capabilities Message (e.g. as at action 315 in FIG. 3), an LPP Provide Capabilities message (e.g. as at action 320 in FIG. 3) or an LPP Request Location Information message.

Figure 9:
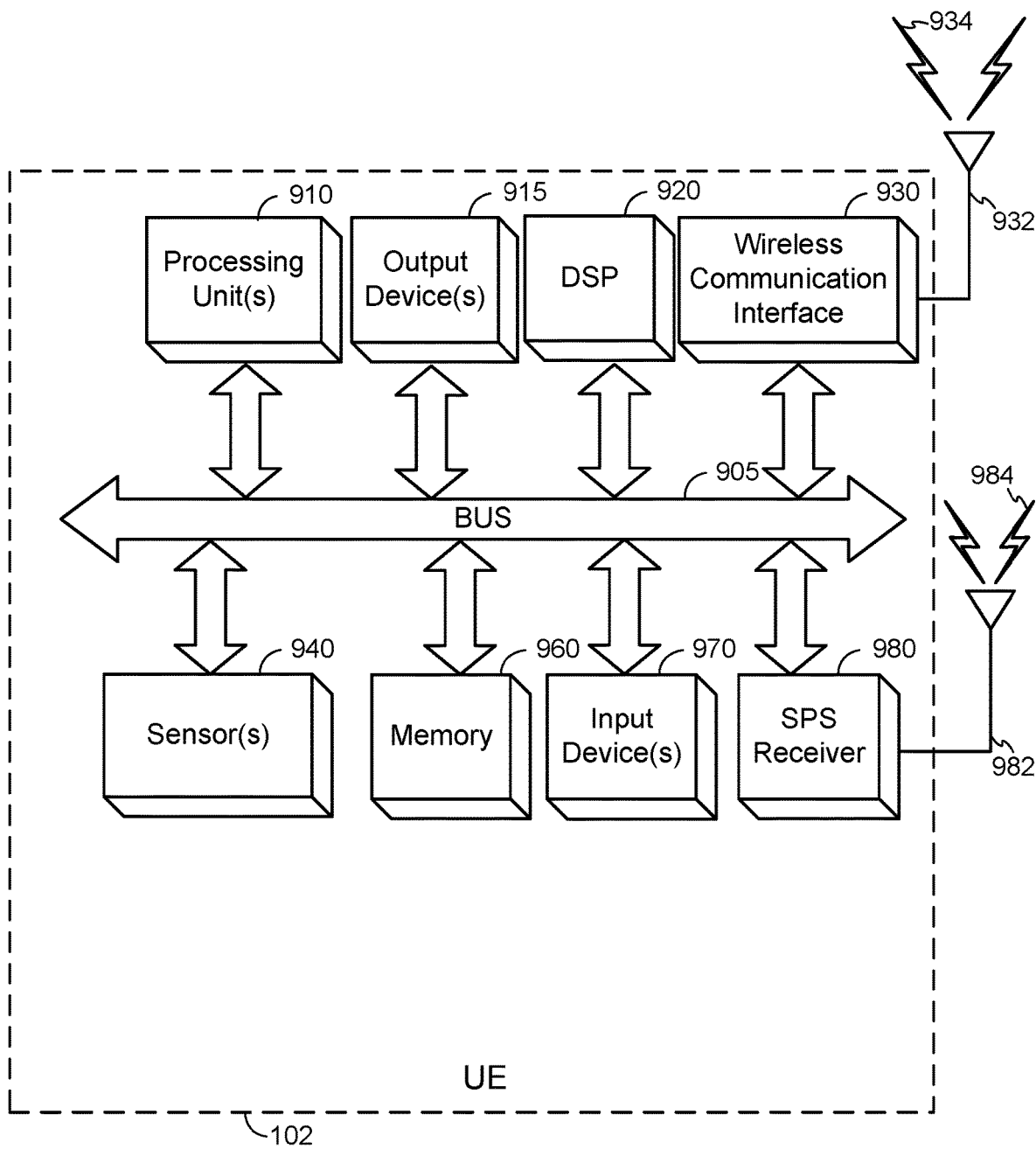
FIG. 9 is a block diagram of an embodiment of a UE.
Figure 10:
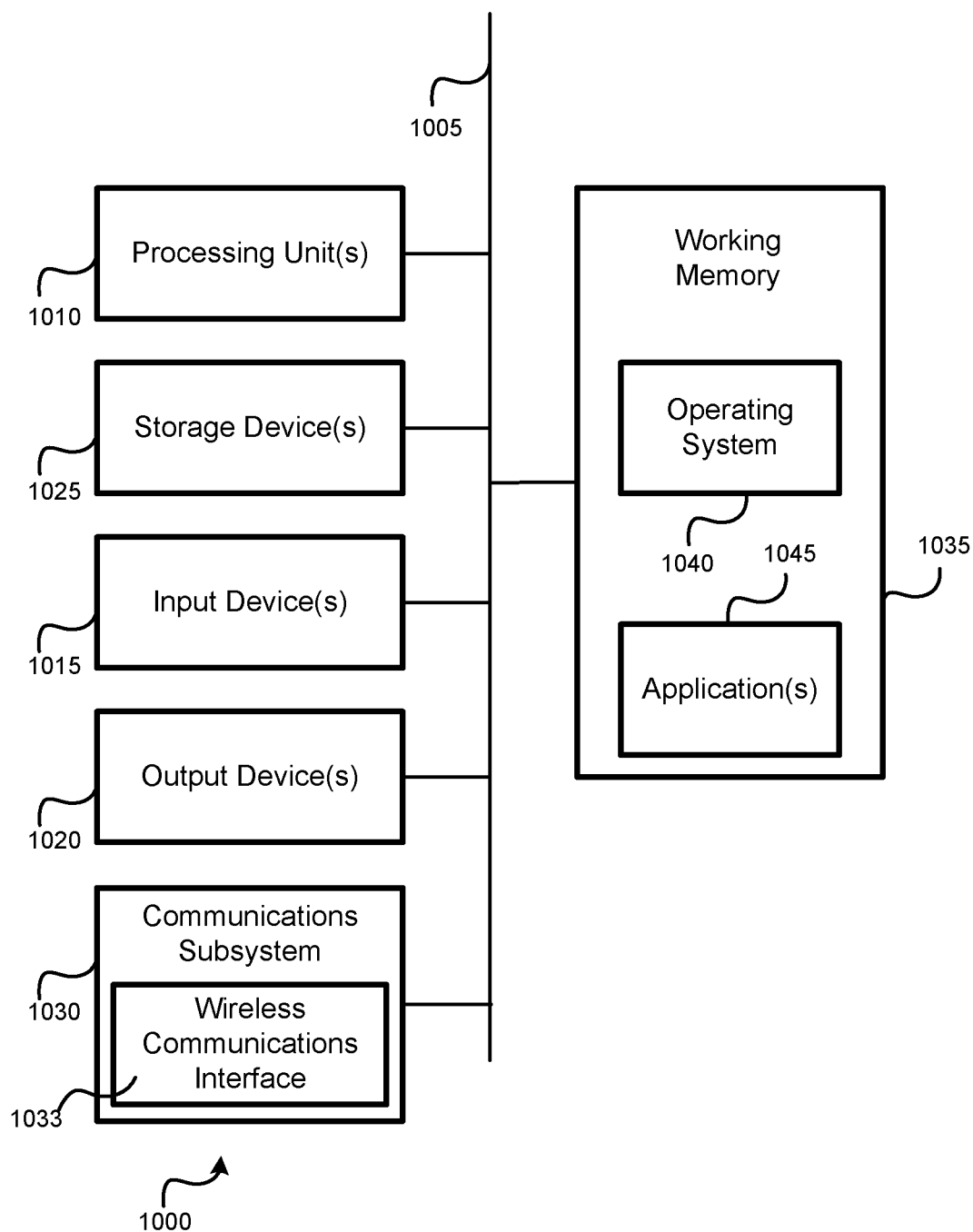
FIG. 10 is a block diagram of a computer system, such as a location server, according to an embodiment.

Means for performing the functionality described in block 710 can include, for example, bus 905, processing unit(s) 910, wireless communication interface 930, wireless communication antenna(s) 932, memory 960, and/or other components of a UE 102 as illustrated in FIG. 9 and described in more detail below, or bus 1005, processing unit(s) 1010, communications subsystem 1030, working memory 1035, operating system 1040, application(s) 1045, and/or other components of a computer system 1000 as illustrated in FIG. 10 and described in more detail below.

At block 720, the functionality includes, after the sending of the first LPP message at block 710, receiving, at the first device from the second device, a plurality of LPP message segments comprising one or more non-final LPP message segments and a final LPP message segment. Here, each non-final LPP message segment of the one or more non-final LPP message segments includes an indication (e.g. in an LPP SegmentationInfo field) that the respective non-final LPP message segment is non-final. In addition, the final LPP message segment includes an indication (e.g. in an LPP SegmentationInfo field) that the final LPP message segment is final. Block 720 may correspond to any of: (i) actions 230, 240-a, 240-b and 250 in FIG. 2; (ii) actions 420-1 and 420-n in FIG. 4; (iii) actions 430-1 and 430-m in FIG. 4; (iv) actions 520-1 and 520-n in FIG. 5; (v) actions 540-1 and 540-m in FIG. 5; (vi) actions 630-1 and 630-n in FIG. 6; and/or (vii) actions 640-1 and 640-m in FIG. 6.

In some embodiments, for example, each LPP message segment in the plurality of LPP message segments comprises a well formed LPP message for a same LPP message type. In some instances, the same LPP message type may comprise an LPP Provide Capabilities message type, an LPP Provide Assistance Data message type, an LPP Request Assistance Data message type, an LPP Request Location Information message type, or an LPP Provide Location Information message type.

Some embodiments may further comprise processing, by the first device, each LPP message segment of the plurality of LPP message segments when the respective LPP message segment is received (e.g. as allowed as an implementation option for rule R5 described previously), where the processing is based on the same LPP message type. Additionally or alternatively, embodiments may further comprise storing, at the first device, each non-final LPP message segment of the one or more non-final LPP message segments, and processing, by the first device, the plurality of LPP message segments after the final LPP message segment is received (e.g. as described previously for FIG. 2 and Rule R5), where the processing is based on the same LPP message type. For example, the processing may comprise (i) computing a location of a UE at an LS if the same LPP message type is a message type for an LPP Provide Location Information message (e.g. as at blocks 360-1 and 360-n in FIG. 3), or (ii) using assistance data to obtain location measurements and/or compute a location of a UE at the UE if the same LPP message type is for an LPP Provide Assistance Data message (e.g. as at block 350-1 in FIG. 3).

Means for performing the functionality described in block 720 can include, for example, bus 905, processing unit(s) 910, wireless communication interface 930, wireless communication antenna(s) 932, memory 960, and/or other components of a UE 102 as illustrated in FIG. 9 and described in more detail below, or bus 1005, processing unit(s) 1010, communications subsystem 1030, working memory 1035, operating system 1040, application(s) 1045, and/or other components of a computer system 1000 as illustrated in FIG. 10 and described in more detail below.

Alternative embodiments of the method illustrated in FIG. 7 may include one or more additional functions. For example, in some instances, prior to sending the first LPP message at block 710, the first device may receive a second LPP message from the second device including an indication (e.g. in an LPP SegmentationInfo field) that the second device is capable of sending segmented LPP messages. The second LPP message may be an LPP Request Capabilities message in one aspect (e.g. as described for action 315 of FIG. 3).

In another aspect of the method illustrated in FIG. 7, the first device may store one or more of the non-final LPP message segments of the plurality of LPP message segments (e.g. as described previously for FIG. 2). Subsequent to storing the one or more of the non-final LPP message segments of the plurality of LPP message segments, the first device may determine an error in the receipt of at least one of the plurality of LPP message segments. In response to determining the error, the first device may discard the one or more of the non-final LPP message segments of the plurality of LPP message segments that were stored. For example, the discarding may be as described previously for rules R1, R3 and/or R4. In this aspect, the method of FIG. 7 may further comprise sending, from the first device to the second device, a message indicative of the determination of the error (e.g. as described for Rules R1, R3 and R4 previously). In this aspect, determining the error in the receipt of the at least one of the plurality of LPP message segments by the first device may comprise determining that the at least one of the plurality of LPP message segments received at the first device has a different message type than the one or more of the non-final LPP message segments of the plurality of LPP message segments, e.g. as described previously for rule R4. Alternatively in this aspect, determining the error in the receipt of the at least one of the plurality of LPP message segments by the first device may comprise determining that the at least one of the plurality of LPP message segments received at the first device has an invalid message type for a current state of a procedure for the plurality of LPP message segments, as described previously for rule R3.

Figure 8:
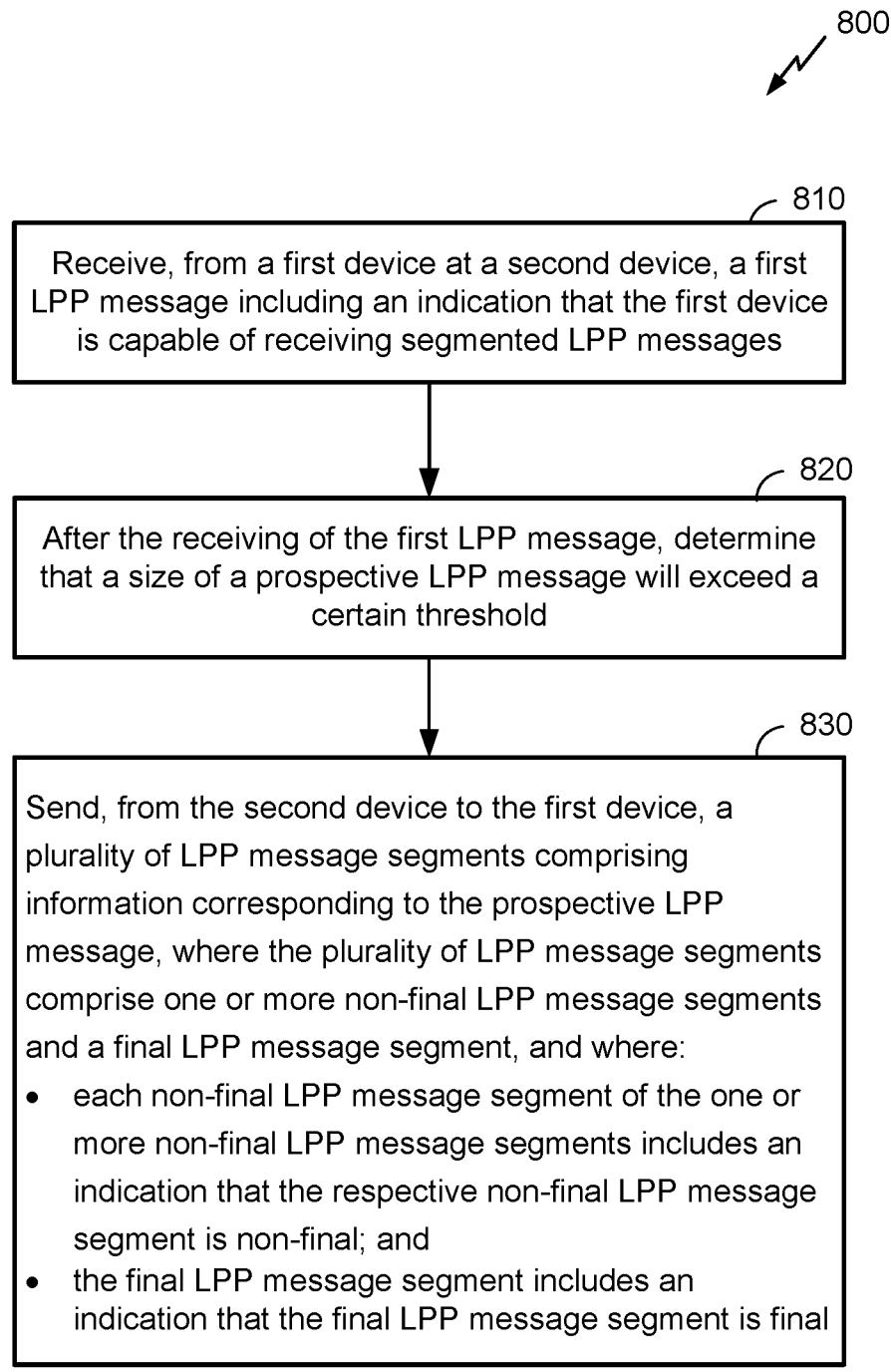

FIG. 8 is a process flow diagram 800 of another method of limiting the size of LPP messages in a location session, according to an embodiment. Alternative embodiments may add, omit, combine, rearrange, separate, and/or otherwise alter the functions as illustrated in FIG. 8. The method illustrated in FIG. 8 can be performed by a UE such as UE 102 or by an LS such as E-SMLC 110, H-SLP 118 or an LMF. Means for performing the functionality described in one or more of the blocks in FIG. 8 can include software and/or hardware components of a mobile device such as the UE 102 illustrated in FIG. 9 and/or a computer system, such as the computer system 1000 illustrated in FIG. 10, both of which are described in more detail below.

At block 810, the functionality comprises receiving, from a first device at a second device, a first LPP message including an indication that the first device is capable of receiving segmented LPP messages. Here again, the first LPP message may be one of any type of LPP message. In some embodiments, for example, the first LPP message comprises an LPP Request Capabilities Message (e.g. as at action 315 in FIG. 3), an LPP Provide Capabilities message (e.g. as at action 320 in FIG. 3), or an LPP Request Location Information message. Moreover, the first device may comprise an E-SMLC (e.g. E-SMLC 110) or LMF and the second device may comprise a UE (e.g. UE 102), Alternatively, the first device may comprise a UE (e.g. UE 102) and the second device may comprise an E-SMLC (e.g. E-SMLC 110) or LMF.

Means for performing the functionality described in block 810 can include, for example, bus 905, processing unit(s) 910, wireless communication interface 930, wireless communication antenna(s) 932, memory 960, and/or other components of a UE 102 as illustrated in FIG. 9 and described in more detail below. Means for performing the functionality described in block 810 can also or instead include, for example, bus 1005, processing unit(s) 1010, communications subsystem 1030, working memory 1035, operating system 1040, application(s) 1045, and/or other components of a computer system 1000 as illustrated in FIG. 10 and described in more detail below.

At block 820, the functionality comprises, after the receiving of the first message at block 810, determining by the second device that a size of a prospective LPP message will exceed a certain threshold. This threshold can be determined based on, for example, size limitations imposed by transport protocols, as described above. Further, as noted above, the prospective LPP message may not need to be created to determine that the size of the prospective LPP message will exceed the threshold. In response to determining that the size of the prospective LPP message will exceed a certain threshold, block 820 may further comprise determining by the second device to segment the prospective LPP message. The determination by the second device to segment the prospective LPP message may be based in part on the indication received at block 810 that the first device is capable of receiving segmented LPP messages. In some embodiments, block 820 may correspond to block 225 in FIG. 2.

Means for performing the functionality described in block 820 can include, for example, bus 905, processing unit(s) 910, memory 960, and/or other components of a UE 102 as illustrated in FIG. 9 and described in more detail below, or bus 1005, processing unit(s) 1010, working memory 1035, operating system 1040, application(s) 1045, and/or other components of a computer system 1000 as illustrated in FIG. 10 and described in more detail below.

At block 830, a plurality of LPP message segments is sent from the second device to the first device. Here, the LPP message segments comprise information corresponding to (e.g. identical to or consistent with) the prospective LPP message. The plurality of LPP message segments further comprise one or more non-final LPP message segments and a final LPP message segment. Here, each non-final LPP message segment of the one or more non-final LPP message segments includes an indication (e.g. in an LPP SegmentationInfo field) that the respective non-final LPP message segment is non-final. In addition, the final LPP message segment includes an indication (e.g. in an SegmentationInfo field) that the final LPP message segment is final. These indications may be provided as a flag or parameter value within each LPP message segment, as described above.

Each LPP message segment in the plurality of LPP message segments sent at block 830 may be a well formed LPP message for a same LPP message type as the prospective LPP message and/or may carry the same LPP transaction ID. For example, if the prospective LPP message is an LPP Provide Location Information message, each LPP message segment may comprise an LPP Provide Location Information message. In some embodiments, the same LPP message type comprises an LPP Provide Capabilities message type, an LPP Provide Assistance Data message type, an LPP Request Assistance Data message type, an LPP Request Location Information message type, or an LPP Provide Location Information message type. In some embodiments, block 830 may correspond to any of: (i) actions 230, 240-*a*, 240-*b* and 250 in FIG. 2; (ii) actions 420-1 and 420-*n* in FIG. 4; (iii) actions 430-1 and 430-*m* in FIG. 4; (iv) actions 520-1 and 520-*n* in FIG. 5; (v) actions 540-1 and 540-*m* in FIG. 5; (vi) actions 630-1 and 630-*n* in FIG. 6; and/or (vii) actions 640-1 and 640-*m* in FIG. 6.

Means for performing the functionality described in block 830 can include, for example, bus 905, processing unit(s) 910, wireless communication interface 930, wireless communication antenna(s) 932, memory 960, and/or other components of a UE 102 as illustrated in FIG. 9 and described in more detail below. Means for performing the functionality described in block 830 can also or instead include, for example, bus 1005, processing unit(s) 1010, communications subsystem 1030, working memory 1035, operating system 1040, application(s) 1045, and/or other components of a computer system 1000 as illustrated in FIG. 10 and described in more detail below.

Alternative embodiments of the method illustrated in FIG. 8 may include one or more additional functions. For example, in some instances, prior to receiving the first LPP message at block 810, the second device may send a second LPP message to the first device including an indication that the second device is capable of sending segmented LPP messages. For example, the second LPP message may be an LPP Request Capabilities message, as at action 315 for FIG. 3.

In another additional aspect of the method for FIG. 8, the second device may receive from the first device a message (e.g. an LPP Error message) indicative of a determination of an error by the first device in the receipt of at least one of the plurality of LPP message segments. In this aspect, and in response to receiving the message indicative of the determination of the error, the second device may abort an LPP session associated with the plurality of LPP message segments.

A possible problem for the solution so far described herein in association with FIGS. 2-8 is that when an error is detected in a received LPP message segment by a receiver (e.g. UE 102 or E-SMLC 110), both the received message segment and any previously received message segments may be discarded by the receiver, as described previously for FIG. 7 and rules R1, R3 and R4. An error message (e.g. an LPP Error message) may also be returned to the sender of the LPP message segment. However, if the receiver then receives another new LPP message segment from the sender for the same segmented LPP message sequence, the receiver may accept the new LPP message segment as being part of a new transaction and new segmented LPP message. For example, this may occur if the sender is not using LPP acknowledgment and has already sent several LPP message segments to the receiver before receiving the error message from the receiver. This may lead to errors including the sender not knowing which LPP message segments were accepted and which were discarded by the receiver.

To avoid this problem, each LPP message segment may include an indication (e.g. in an LPP SementationInfo field) indicating whether it is the first segment, a subsequent not last segment or a last segment. If an error is detected by a receiver in a first LPP message segment or in a subsequent (last or not last) LPP message segment where the receiver still has the first LPP message segment, the receiver can discard the LPP message segment in error and any previously received and stored LPP message segments as described previously. However, different to the previous solution, if an LPP message segment is received that indicates a subsequent (last or not last) LPP message segment where the receiver does not have the first LPP message segment already stored, the receiver can discard the received LPP message segment whether or not any other errors are detected. In addition, no indication may be returned to the sender other than an acknowledgment if an acknowledgment was requested by the sender. With this modification in the solution, a receiver can avoid mistakenly receiving and accepting later segments of a segmented LPP message after an error has been detected for earlier LPP message segments which caused the receiver to discard the earlier LPP message segments.

With the modified solution, a new parameter may be included in an LPP message which can indicate one of "first Message", "subsequent Message Not Last", or "last Message". The parameter may only be included with LPP message segmentation and not for an unsegmented LPP message. If the parameter "first Message" is included in an LPP message, it could indicate to a receiving entity that this is the first LPP message segment and that more LPP message segments will follow. If the parameter "subsequent Message Not Last" is included in an LPP message, it could indicate to the receiving entity that this is a subsequent LPP message segment and that more LPP message segments will follow. If the parameter "last Message" is included in an LPP message, it could indicate to the receiving entity that this is the last LPP message segment and that no more LPP message segments will follow. Other aspects of the modified solution including an indication of UE and LS capability to support sending and/or receiving of segmented LPP messages may be the same as or similar to those described previously in association with FIGS. 2-8.

FIG. 9 illustrates an embodiment of a UE 102, which can be utilized as described in the embodiments described above and described in FIGS. 1-8. It should be noted that FIG. 9 is meant only to provide a generalized illustration of various components, any or all of which may be utilized as appropriate. In other words, because UEs can vary widely in functionality, they may include only a portion of the components shown in FIG. 9. It can be noted that, in some instances, components illustrated in FIG. 9 can be localized to a single physical device and/or distributed among various networked devices, which may be disposed at different physical locations.

The UE 102 is shown comprising hardware elements that can be electrically coupled via a bus 905 (or may otherwise be in communication, as appropriate). The hardware elements may include a processing unit(s) 910 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 9, some embodiments may have a separate DSP 920, depending on desired functionality. The UE 102 also may comprise one or more input devices 970, which may comprise without limitation one or more touch screens, touch pads, microphones, buttons, dials, switches, and/or the like; and one or more output devices 915, which may comprise without limitation, one or more displays, light emitting diode (LED)s, speakers, and/or the like.

The UE 102 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, cellular communication facilities, etc.), and/or the like, which may enable UE 102 to communicate via the networks and RATs described above with regard to FIG. 1. The wireless communication interface 930 may permit data to be communicated with a network, an LS, wireless access points, wireless base stations, other computer systems, and/or any other electronic devices described herein. The communication can be carried out via one or more wireless communication antenna(s) 932 that send and/or receive wireless signals 934.

Depending on desired functionality, the wireless communication interface 930 may comprise separate transceivers to communicate with base stations (e.g., eNBs 104 and 106 of FIG. 1) and other terrestrial transceivers, such as wireless devices and access points, belonging to or associated with one or more wireless networks. These wireless networks may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX™ (IEEE 802.16) network, and so on. A CDMA network may implement one or more radio access technologies (RATs) such as cdma2000, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G, NR and so on. LTE, LTE Advanced, NR, GSM, and WCDMA are described (or are being described) in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

The UE 102 can further include sensor(s) 940. Such sensors may comprise, without limitation, one or more accelerometer(s), gyroscope(s), camera(s), magnetometer(s), altimeter(s), microphone(s), proximity sensor(s), light sensor(s), barometer(s), and the like. Some or all of the sensor(s) 940 can be utilized, among other things, for obtaining location measurements and/or obtaining other types of location information that may be communicated to an LS.

Embodiments of UE 102 may also include an SPS receiver 980 capable of receiving signals 984 from one or more SPS satellites using an SPS antenna 982, which may be combined with antenna(s) 932 in some implementations. Positioning of UE 102 using SPS receiver 980 may be utilized to complement and/or incorporate the techniques described herein, e.g. may be used to obtain location information by UE 102. The SPS receiver 980 may support measurement of signals from SPS SVs of an SPS system (e.g. SVs 160 in FIG. 1), such as a GNSS (e.g., Global Positioning System (GPS)), Galileo, GLONASS, Quasi-Zenith Satellite System (QZSS) over Japan, Indian Regional Navigational Satellite System (IRNSS) over India, Beidou over China, and/or the like. Moreover, the SPS receiver 980 may be used with various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The UE 102 may further include and/or be in communication with a memory 960. The memory 960 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. The memory 960 may be used, among other things, to store AD received from an LS (e.g. received using LPP message segmentation as described previously herein) using a database, linked list, or any other type of data structure. In some embodiments, wireless communication interface 930 may additionally or alternatively comprise memory.

The memory 960 of UE 102 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality for UE 102 discussed above might be implemented as code and/or instructions executable by UE 102 (and/or a processing unit within the UE 102). In an aspect, then, such code and/or instructions can be used to configure and/or adapt a general purpose computer (or other device) to perform one or more operations in accordance with the described methods.

FIG. 10 illustrates an embodiment of a computer system 1000, which may be used, in whole or in part, to provide the functions of an LS as described in the embodiments above. The computer system 1000 may therefore correspond to E-SMLC 110, H-SLP 118, or an LMF, for example, as described herein. It should be noted that FIG. 10 is meant only to provide a generalized illustration of various components, any or all of which may be utilized as appropriate.

FIG. 10, therefore, broadly illustrates how individual system elements may be implemented in a relatively separated or relatively more integrated manner. In addition, it can be noted that components illustrated in FIG. 10 can be localized to a single device and/or distributed among various networked devices, which may be disposed at different geographical locations.

The computer system 1000 is shown comprising hardware elements that can be electrically coupled via a bus 1005 (or may otherwise be in communication, as appropriate). The hardware elements may include processing unit(s) 1010, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1000 also may comprise one or more input devices 1015, which may comprise without limitation a mouse, a keyboard, a camera, a microphone, and/or the like; and one or more output devices 1020, which may comprise without limitation a display device, a printer, and/or the like.

The computer system 1000 may further include (and/or be in communication with) one or more non-transitory storage devices 1025, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Such data stores may include database(s) and/or other data structures used to store and administer messages and/or other information to be sent to one or more devices as described herein.

The computer system 1000 may also include a communications subsystem 1030, which may comprise wireless communication technologies managed and controlled by a wireless communication interface 1033, as well as wired technologies (such as Ethernet, coaxial communications, universal serial bus (USB), and the like). The communications subsystem may comprise a modem, a network card (wireless or wired), an infrared communication device, a wireless communication device, and/or a chipset, and/or the like, which may enable the computer system 1000 to communicate on any or all of the communication networks described herein to any device on or accessible from the respective network, including the UE 102, other computer systems, and/or any other electronic devices described herein. Hence, the communications subsystem 1030 may be used to receive and send signaling and messages as described in the embodiments herein.

In many embodiments, the computer system 1000 will further comprise a working memory 1035, which may comprise a RAM or ROM device, as described above. Software elements, shown as being located within the working memory 1035, may comprise an operating system 1040, device drivers, executable libraries, and/or other code, such as one or more applications 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions may be used to configure and/or adapt a general purpose computer (or other device) to perform one or more operations in accordance with the described techniques.

A set of these instructions and/or code may be stored on a non-transitory computer-readable storage medium, such as the storage device(s) 1025 described above. In some cases, the storage medium may be incorporated within a computer system, such as computer system 1000. In other embodiments, the storage medium may be separate from a computer system (e.g., a removable medium, such as an optical disc), and/or provided in an installation package, such that the storage medium can be used to program, configure, and/or adapt a general purpose computer with the instructions/code stored thereon. These instructions may take the form of executable code, which is executable by the computer system 1000 and/or may take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

It can be noted that, for many functions described herein, specific means have also been described as being capable of performing such functions. It can be understood, however, that functionality is not limited to the means disclosed. A person of ordinary skill in the art will appreciate that alternative means for performing similar functions may additionally or alternatively be used to those means described herein.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for limiting a size of Long Term Evolution (LTE) Positioning Protocol (LPP) messages in a location session, the method comprising:
   sending, from a first device to a second device, a first LPP message including a request for location information; and
   after the sending of the first LPP message, receiving, at the first device from the second device, the location information via a plurality of LPP message segments comprising one or more non-final LPP message segments and a final LPP message segment, wherein:
      each non-final LPP message segment of the one or more non-final LPP message segments includes a segmentation information field that is set to a first value to indicate that the respective non-final LPP message segment is non-final and that one or more additional LPP message segments will be transferred,
      the final LPP message segment includes the segmentation information field that is set to a second value to indicate that the final LPP message segment is final, and
      each LPP message segment includes an end transaction field that is set to true to indicate the end of an LPP transaction that includes the plurality of the LPP message segments and wherein the respective value of segmentation information field is set independently of the value of the end transaction field.

2. The method of claim 1, wherein:
   the first device comprises an Enhanced Serving Mobile Location Center (E-SMLC) or a Location Management Function (LMF) and the second device comprises a User Equipment (UE).

3. The method of claim 1, wherein the first LPP message comprises an LPP Request Location Information message.

4. The method of claim 1, further comprising, prior to sending the first LPP message, receiving, at the first device, a second LPP message from the second device including an indication that the second device is capable of sending segmented LPP messages.

5. The method of claim 4, wherein the second LPP message comprises an LPP Request Capabilities message.

6. The method of claim 1, wherein each LPP message segment in the plurality of LPP message segments comprises a well formed LPP message for a same LPP message type.

7. The method of claim 6, wherein the same LPP message type comprises an LPP Provide Location Information message type.

8. The method of claim 6 and further comprising:
   storing, at the first device, each non-final LPP message segment of the one or more non-final LPP message segments; and
   processing, by the first device, the plurality of LPP message segments after the final LPP message segment is received, wherein the processing is based on the same LPP message type.

9. The method of claim 1, further comprising:
   storing, at the first device, one or more of the non-final LPP message segments of the plurality of LPP message segments;
   subsequent to storing the one or more of the non-final LPP message segments of the plurality of LPP message segments, determining an error, by the first device, in the receipt of at least one of the plurality of LPP message segments; and
   in response to determining the error, discarding, by the first device, the one or more of the non-final LPP message segments of the plurality of LPP message segments.

10. The method of claim 9, further comprising sending, from the first device to the second device, a message indicative of the determination of the error.

11. The method of claim 9, wherein the determining the error in the receipt of the at least one of the plurality of LPP message segments comprises determining that the at least one of the plurality of LPP message segments received at the first device has a different message type than the one or more of the non-final LPP message segments of the plurality of LPP message segments.

12. The method of claim 9, wherein the determining the error in the receipt of the at least one of the plurality of LPP message segments comprises determining that the at least one of the plurality of LPP message segments received at the first device has an invalid message type for a current state of a procedure for the plurality of LPP message segments.

13. The method of claim 1 wherein receiving comprises receiving segmented LPP messages periodically, and wherein:
   for non-final periods of segmented LPP messages, the segmentation information field of the final LPP message segment is set to the second value to indicate that no more LPP messages will be transferred while the end transaction field of the final LPP message segment is set to false; and
   for final period of segmented LPP messages, the segmentation information field of the final LPP message segment is set to the second value to indicate that no more LPP messages will be transferred while the end transaction field of the final LPP message segment of the plurality of LPP message segments is set to true.

14. A method for limiting a size of Long Term Evolution (LTE) Positioning Protocol (LPP) messages in a location session, the method comprising:

receiving, from a first device at a second device, a first LPP message including a request for location information;

after the receiving of the first LPP message, determining that a size of a prospective LPP message comprising the location information will exceed a certain threshold; and sending, from the second device to the first device, a plurality of LPP message segments comprising information corresponding to the prospective LPP message, the plurality of LPP message segments comprising one or more non-final LPP message segments and a final LPP message segment wherein:

each non-final LPP message segment of the one or more non-final LPP message segments includes a segmentation information field that is set to a first value to indicate that the respective non-final LPP message segment is non-final and that one or more additional LPP message segments will be transferred, the final LPP message segment includes the segmentation information field that is set to a second value to indicate that the final LPP message segment is final, and each LPP message segment includes an end transaction field that is set to true to indicate the end of an LPP transaction that includes the plurality of the LPP message segments and wherein the respective value of segmentation information field is set independently of the value of the end transaction field.

15. The method of claim 14, wherein:
the first device comprises an Enhanced Serving Mobile Location Center (E-SMLC) or a Location Management Function (LMF) and the second device comprises a User Equipment (UE).

16. The method of claim 14, wherein the first LPP message comprises an LPP Request Location Information message.

17. The method of claim 14, wherein each LPP message segment in the plurality of LPP message segments comprises a well formed LPP message for a same LPP message type as the prospective LPP message.

18. The method of claim 17, wherein the same LPP message type comprises an LPP Provide Location Information message type.

19. The method of claim 14, further comprising, prior to receiving the first LPP message, sending, from the second device, a second LPP message to the first device including an indication that the second device is capable of sending segmented LPP messages.

20. The method of claim 19, wherein the second LPP message comprises an LPP Request Capabilities message.

21. The method of claim 14, further comprising:
receiving, at the second device from the first device, a message indicative of a determination of an error in the receipt of at least one of the plurality of LPP message segments; and in response to receiving the message indicative of the determination of the error, aborting an LPP session associated with the plurality of LPP message segments.

22. The method of claim 14 wherein sending comprises sending segmented LPP messages periodically, and wherein:
for non-final periods of segmented LPP messages, the segmentation information field of the final LPP message segment is set to the second value to indicate that no more LPP messages will be transferred while the end transaction field of the final LPP message segment is set to false; and for final period of segmented LPP messages, the segmentation information field of the final LPP message segment is set to the second value to indicate that no more LPP messages will be transferred while the end transaction field of the final LPP message segment of the plurality of LPP message segments is set to true.

23. A device for receiving segmented Long Term Evolution (LTE) Positioning Protocol (LPP) messages, the device comprising:
a communication interface;
a memory; and
a processing unit communicatively coupled with the communication interface and the memory and configured to cause the device to:
send, via the communication interface to a transmitting device, a first LPP message including a request for location information; and after the sending of the first LPP message, receive, via the communication interface from the transmitting device, the location information via a plurality of LPP message segments comprising one or more non-final LPP message segments and a final LPP message segment, wherein:

each non-final LPP message segment of the one or more non-final LPP message segments includes a segmentation information field that is set to a first value to indicate that the respective non-final LPP message segment is non-final and that one or more additional LPP message segments will be transferred, the final LPP message segment includes the segmentation information field that is set to a second value to indicate that the final LPP message segment is final, and each LPP message segment includes an end transaction field that is set to true to indicate the end of an LPP transaction that includes the plurality of the LPP message segments and wherein the respective value of segmentation information field is set independently of the value of the end transaction field.

24. The device of claim 23, wherein:
the device comprises an Enhanced Serving Mobile Location Center (E-SMLC) or a Location Management Function (LMF) and the transmitting device comprises a User Equipment (UE).

25. The device of claim 23, wherein the device is configured to receive, prior to sending the first LPP message, a second LPP message from the transmitting device including an indication that the transmitting device is capable of sending segmented LPP messages.

26. The device of claim 23, wherein the processing unit is further configured to cause the device to receive each LPP message segment in the plurality of LPP message segments comprising a well formed LPP message for a same LPP message type.

27. The device of claim 26, wherein the processing unit is further configured to cause the device to:
store, in the memory, each non-final LPP message segment of the one or more non-final LPP message segments; and process the plurality of LPP message segments after the final LPP message segment is received, wherein the processing is based on the same LPP message type.

28. The device of claim 23, wherein the processing unit is further configured to cause the device to:
- store, in the memory, one or more of the non-final LPP message segments of the plurality of LPP message segments;
- subsequent to storing the one or more of the non-final LPP message segments of the plurality of LPP message segments, determine an error in the receipt of at least one of the plurality of LPP message segments; and
- in response to determining the error, discard the one or more of the non-final LPP message segments of the plurality of LPP message segments.

29. The device of claim 23, wherein the processing unit is configured to receive segmented LPP messages periodically, and wherein:
- for non-final periods of segmented LPP messages, the segmentation information field of the final LPP message segment is set to the second value to indicate that no more LPP messages will be transferred while the end transaction field of the final LPP message segment is set to false; and
- for final period of segmented LPP messages, the segmentation information field of the final LPP message segment is set to the second value to indicate that no more LPP messages will be transferred while the end transaction field of the final LPP message segment of the plurality of LPP message segments is set to true.

30. A device for transmitting segmented Long Term Evolution (LTE) Positioning Protocol (LPP) messages the device comprising:
- a communication interface;
- a memory; and
- a processing unit communicatively coupled with the communication interface and the memory and configured to cause the device to:
- receive, via the communication interface from a receiving device, a first LPP message including a request for location information;
- after the receiving of the first LPP message, determine that a size of a prospective LPP message comprising the location information will exceed a certain threshold; and
- send, via the communication interface to the receiving device, a plurality of LPP message segments comprising information corresponding to the prospective LPP message, the plurality of LPP message segments comprising one or more non-final LPP message segments and a final LPP message segment wherein:
  - each non-final LPP message segment of the one or more non-final LPP message segments includes a segmentation information field that is set to a first value to indicate that the respective non-final LPP message segment is nonfinal and that one or more additional LPP message segments will be transferred,
  - the final LPP message segment includes the segmentation information field that is set to a second value to indicate that the final LPP message segment is final, and
  - each LPP message segment includes an end transaction field that is set to true to indicate the end of an LPP transaction that includes the plurality of the LPP message segments and wherein the respective value of segmentation information field is set independently of the value of the end transaction field.

31. The device of claim 30, wherein:
the receiving device comprises an Enhanced Serving Mobile Location Center (E-SMLC) or a Location Management Function (LMF) and the device comprises a User Equipment (UE).

32. The device of claim 30, wherein processing unit is further configured to cause the device to send, prior to receiving the first LPP message, a second LPP message to the receiving device including an indication that the device is capable of sending segmented LPP messages.

33. The device of claim 30, wherein the processing unit is further configured to cause the device to:
- receive from the receiving device, via the communication interface, a message indicative of a determination of an error in the receipt of at least one of the plurality of LPP message segments; and
- in response to receiving the message indicative of the determination of the error, abort an LPP session associated with the plurality of LPP message segments.

34. The device of claim 30, wherein the processing unit is configured to send segmented LPP messages periodically, and wherein:
- for non-final periods of segmented LPP messages, the segmentation information field of the final LPP message segment is set to the second value to indicate that no more LPP messages will be transferred while the end transaction field of the final LPP message segment is set to false; and
- for final period of segmented LPP messages, the segmentation information field of the final LPP message segment is set to the second value to indicate that no more LPP messages will be transferred while the end transaction field of the final LPP message segment of the plurality of LPP message segments is set to true.

* * * * *